United States Patent [19]

Kawakatsu

[11] 4,335,429
[45] Jun. 15, 1982

[54] CONTROL APPARATUS FOR ENGINE/ELECTRIC HYBRID VEHICLE

[75] Inventor: Shiro Kawakatsu, Suita, Japan

[73] Assignee: Daihatsu Motor Co., Ltd., Ikeda, Japan

[21] Appl. No.: 129,718

[22] Filed: Mar. 12, 1980

[30] Foreign Application Priority Data

Mar. 20, 1979 [JP] Japan .................................. 54-34977

[51] Int. Cl.³ ............................................ B60K 1/00
[52] U.S. Cl. ............................... 364/424; 180/65 A; 364/426
[58] Field of Search ....................... 364/424, 426, 442; 180/65 R, 65 A, 65 C; 123/2; 290/1 A

[56] References Cited

U.S. PATENT DOCUMENTS

| | | | |
|---|---|---|---|
| 3,861,484 | 1/1975 | Joslin | 180/65 A |
| 3,923,115 | 12/1975 | Helling | 180/65 A |
| 4,021,677 | 5/1977 | Rosen | 180/65 A |
| 4,042,056 | 8/1977 | Horwinski | 180/65 A |
| 4,097,752 | 6/1978 | Wulf et al. | 180/65 A |
| 4,148,192 | 4/1979 | Cummings | 180/65 A |
| 4,180,138 | 12/1979 | Shea | 180/65 A |

*Primary Examiner*—Errol A. Krass
*Attorney, Agent, or Firm*—Darby & Darby

[57] ABSTRACT

A hybrid vehicle comprises an internal combustion engine, a relatively large motor/generator and a relatively small motor/generator, which are controlled by a microcomputer based on the required torque of the vehicle as a function of time. When the engine is permitted to run, it is always operated in that region which minimizes fuel consumption. If the torque of the engine is too low to drive the vehicle, the relatively large motor is energized to make up for the deficiency. When the engine produces excess torque, the relatively large motor/generator absorbs the excess and is operated as a generator to generate electricity. Braking torque is usually obtained by operating the relatively large motor/generator as a generator. When braking torque is insufficient, the relatively small motor/generator is also operated as a generator to make up for the deficiency.

26 Claims, 27 Drawing Figures

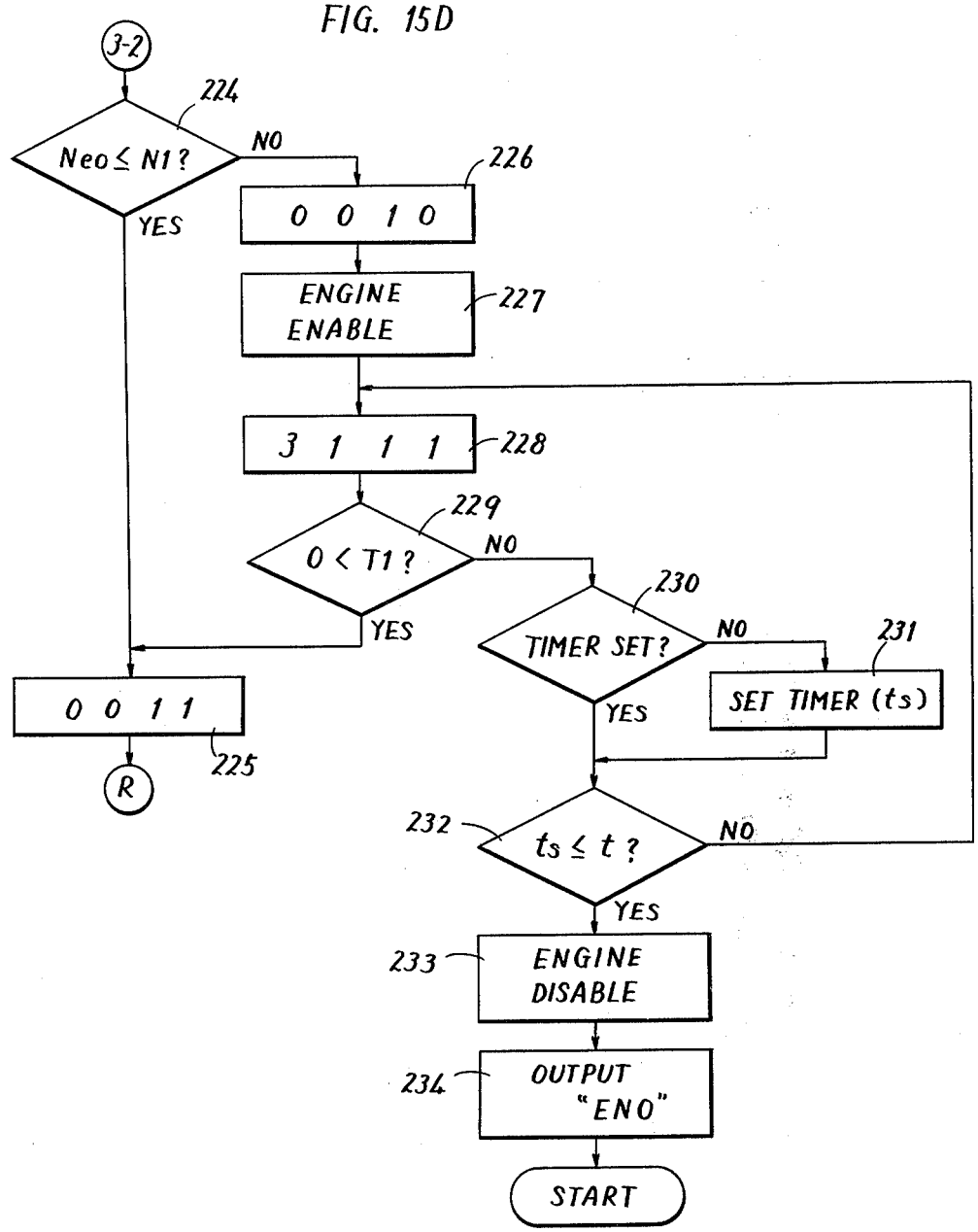

CONTROL APPARATUS FOR ENGINE/ELECTRIC HYBRID VEHICLE

BACKGROUND OF THE INVENTION

1. Field of the Invention

The present invention relates to an apparatus for controlling a hybrid vehicle. More specifically, the present invention relates to an apparatus for controlling a hybrid vehicle to reduce its fuel consumption.

2. Description of the Prior Art

An electric vehicle is one of the most effective means of transportation by virtue of its freedom from pollution as compared with vehicles employing other conventional prime movers. However, an electric vehicle suffers from various disadvantages; a long period is required to charge the battery, and both running distance and running time are short. In view of the foregoing, a hybrid vehicle (an electric vehicle with an internal combustion engine) has been proposed and put into practical use, eliminating these disadvantages without losing the advantages of an electric vehicle. Naturally such a hybrid vehicle consumes fuel in an engine running mode and consumes electric power in a motor running mode.

An automobile having the smallest possible fuel consumption has been desired. It has also been desired to purify exhaust gas from the automobile since gas from an engine is one cause of air pollution. It has been well-known that exhaust gas from an engine is purer when engine efficiency is better.

On the other hand, an automotive internal combustion engine requires a wide range of torque and speed so as to be adaptable to conditions of use, such as constant speed operation, acceleration, hill climbing and the like. Nevertheless, each internal combustion engine has a region in which its fuel consumption is minimized. An automotive internal combustion engine operates in that region when climbing hills or accelerating. Therefore, it is conceivable to minimize engine capacity and therefore minimize maximum power, so that the automobile is normally operated in its region of minimum fuel consumption. However, with only such an engine, it is impossible to attain a required driving torque which will suffice in all running conditions. Therefore, the inventors of the present invention previously proposed an improved hybrid vehicle wherein the engine is always operated in its most fuel-efficient region, and driving torque deficiencies are made up by an electric motor, whereby overall fuel consumption as well as overall energy efficiency of the vehicle is enhanced.

However, previous hybrid vehicles required an electric motor having a power sufficient to satisfy all speed characteristics and torque requirements for all running conditions. In such cases, motor and engine efficiency is poor in a low load condition such as normal operation, and saving energy is difficult. On the other hand, it is well-known that an electric motor can be used as a generator during braking, thus saving energy. However, since the motor in a previously proposed hybrid vehicle has a large continuous rating, it is impossible to so use the motor. More specifically, when a motor with a large continuous rating is used in a hybrid vehicle, the motor does not work well as a generator, because when the vehicle speed drops, the motor will not produce a sufficiently high voltage. It is also conceivable to employ a voltage boosting means such as a transformer, but even this cannot provide a sufficiently high voltage without having extremely poor efficiency. Since a vehicle is operated at speeds between 0 km/h to 100 km/h, it could very often happen that the speed would not be high enough to provide enough voltage to regenerate its battery. Accordingly, a hybrid vehicle is not efficient enough. The size and cost of a motor/generator increase approximately as the square of its capacity, and a motor/generator that is capable of coping with all running conditions becomes large and extremely expensive.

SUMMARY OF THE INVENTION

In order to eliminate these problems, the present invention employs an internal combustion engine and two electric motors in a hybrid vehicle. The internal combustion engine is only allowed to operate in its region of maximum fuel efficiency. When the vehicle output shaft speed is within an optimum speed range of the internal combustion engine, any additional torque required will be supplied by one motor while the engine operates at its maximum torque rating. If output shaft speed is outside this optimum speed range, additional torque is usually supplied by one of the electric motors. If torque is still deficient, the deficiency is supplied by the other motor.

According to the present invention, the internal combustion engine is only operated in its region of minimum fuel consumption and efficiency is drastically improved. When the engine produces insufficient torque by itself, the additional torque is supplied by the electric motors. Hence, torque sufficient for all running conditions (such as constant speed operation, acceleration, or hill climbing) can be attained. Since two electric motors are used in the vehicle, they can provide enough torque to run the vehicle even if the engine is not permitted to operate.

In a preferred embodiment of the present invention, one of these two electric motors is coupled to the output shaft of the vehicle. That motor is constantly used for supplying torque, while the other motor is used as an auxiliary motor for supplying a deficient torque. Accordingly, the one motor need not be large and the auxiliary motor may have a short time rating, such as three minutes. Accordingly, the total cost and size of these two electric motors can be reduced. If the torque required is less than the minimum torque produced by the engine in its best fuel consumption range, the internal combustion engine is operated at this minimum torque, while the excess torque is absorbed by operating the one motor as a generator. The two motors can be more efficient even at relatively slow vehicle speed, and more energy is saved. More specifically, even when the torque required is less than the minimum torque produced when the engine is permitted to operate, degradation of fuel comsumption or thermal efficiency is avoided by operating the engine at that minimum torque, while the excess torque is absorbed by the generator. Driving torque and required torque are thus matched. Electricity generated by the generator regenerates the battery without being wasted and loss of electrical output is decreased. Overall energy savings result.

Accordingly, a principal object of the present invention is to provide an improved hybrid vehicle.

Another object of the present invention is to provide an improved hybrid vehicle having an internal combustion engine and two electric motors or motor/generators.

A further object of the present invention is to provide an apparatus for controlling a hybrid vehicle that can minimize fuel consumption of its internal combustion engine.

Still a further object of the present invention is to provide an apparatus for controlling a hybrid vehicle that can achieve the best overall energy efficiency.

Still another object of the present invention is to provide an apparatus for controlling a hybrid vehicle which will save energy in all operating conditions.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
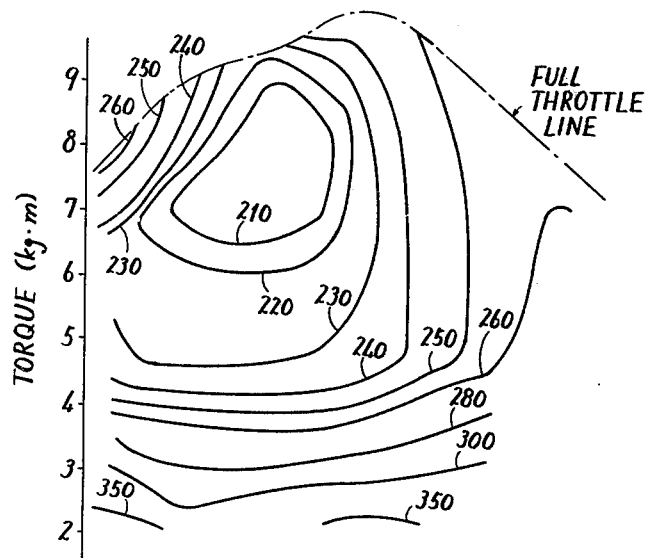
FIG. 1 is a graph showing the fuel consumption characteristics of a gasoline engine, wherein the abscissa indicates output shaft speed ($\times 100$ rpm) and the ordinate indicates the shaft torque (kg·m)

FIG. 1 is a graph showing fuel consumption characteristics of a given internal combustion engine (referred to as an engine hereinafter) for depicting the principle of the present invention, wherein the abscissa indicates the number of revolutions of the shaft of the engine ($\times 10^2$ rpm) and the ordinate indicates the shaft torque (kg·m). Such a graph showing a fuel consumption characteristic is well-known as a map of specific fuel consumption. In particular, FIG. 1 applies to a gasoline engine of 1000 cc having four cylinders. More specifically, by taking an example in the FIG. 1 graph, the fuel consumption is minimal, or the thermal efficiency is maximal, when the gasoline engine is run within a range in which the specific fuel consumption (gr/PS·h) is "210". The present invention operates such that an engine in a hybrid vehicle is run within a region having a relatively better thermal efficiency based on the specific fuel consumption as shown in FIG. 1, for example, only the engine is run as a prime mover of the vehicle if the shaft speed and the torque reside in that range of the specific fuel consumption which is less than approximately 220 to 230 (gr/PS·h). The inventive hybrid vehicle employs two motors. If the shaft speed of the vehicle is outside the speed range in which the engine is permitted to operate, one and the other motors are selectively energized in a proper combination to attain the required torque and, when the required torque of the vehicle exceeds a predetermined upper limit of the torque range in which the engine is permitted to operate, a combination of the engine and one motor is used as a prime mover.

Figure 2:
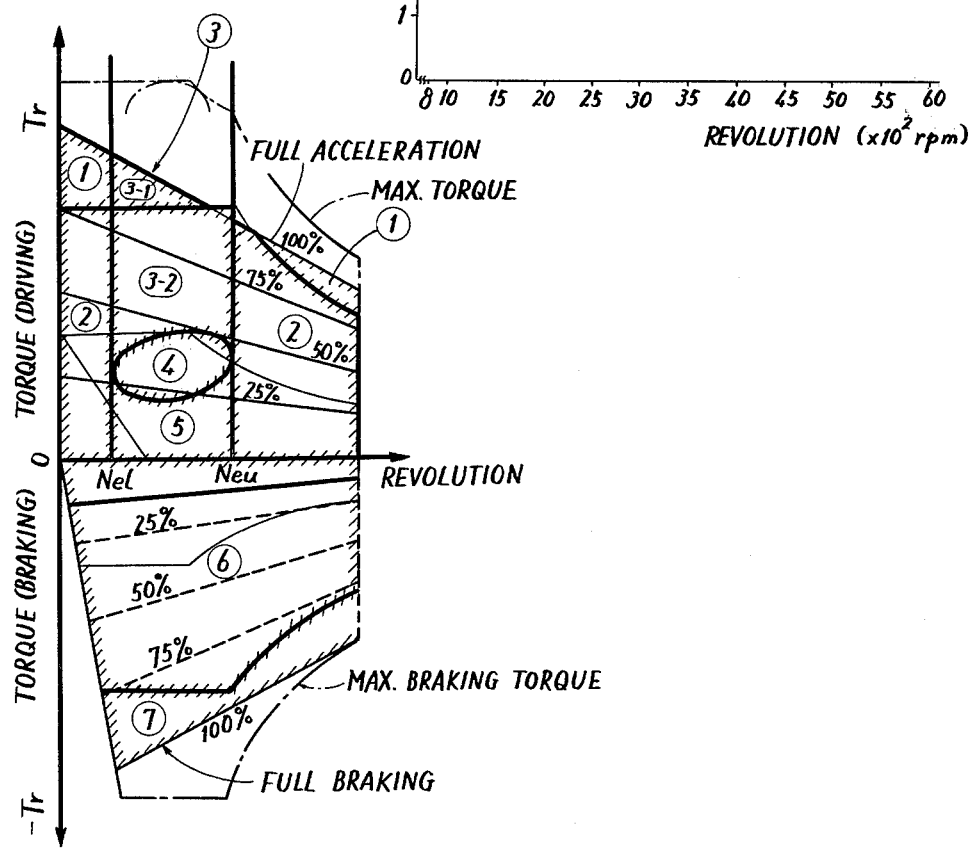
FIG. 2 is a graph showing the operating regions used in the present invention, wherein the abscissa indicates output shaft speed and the ordinate indicates the required shaft torque.
Figure 3:
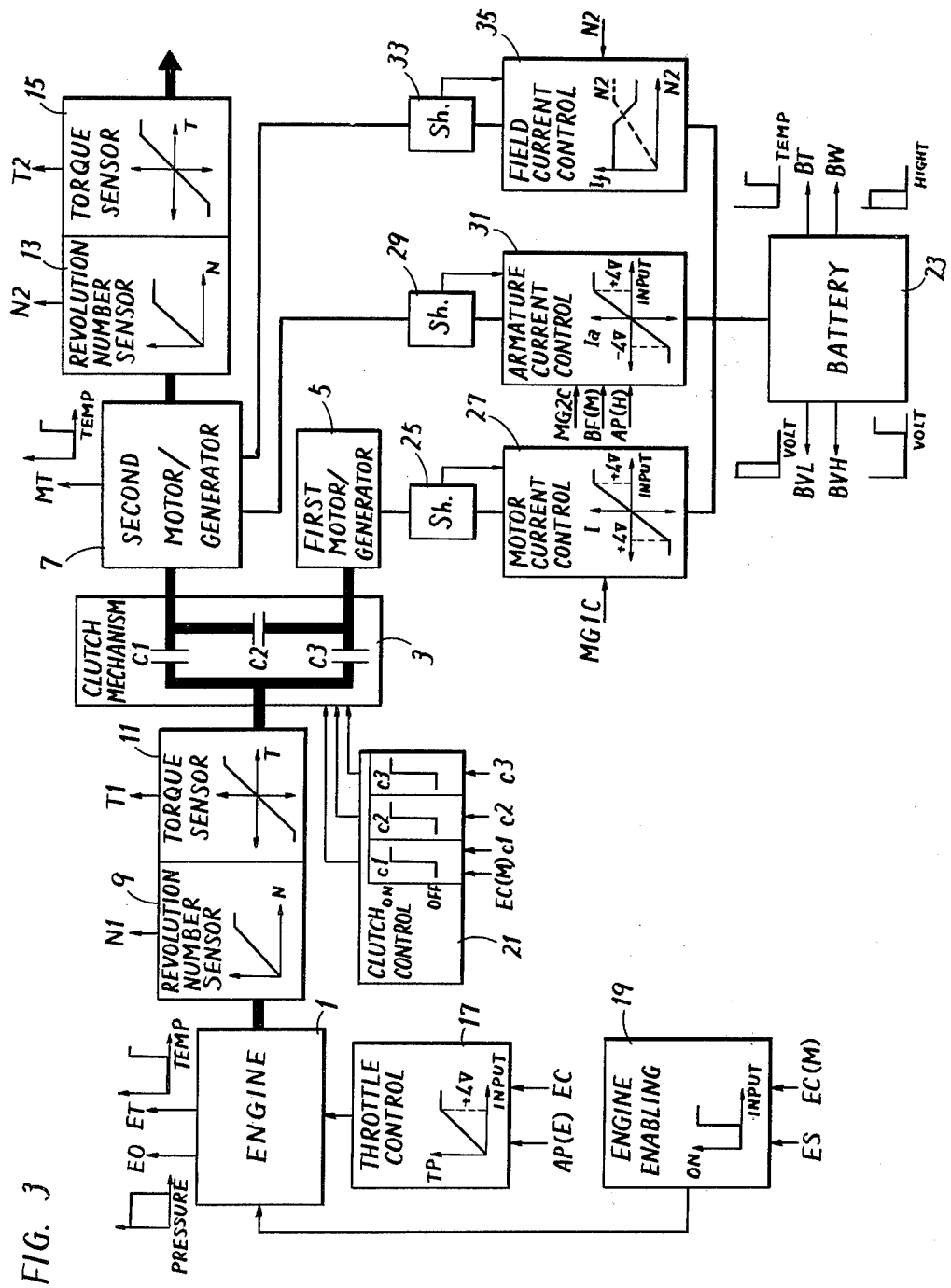
FIGS. 3, 4, 5, 6A, 6B and 7 are block diagrams depicting one embodiment of the present invention.
Figure 4:
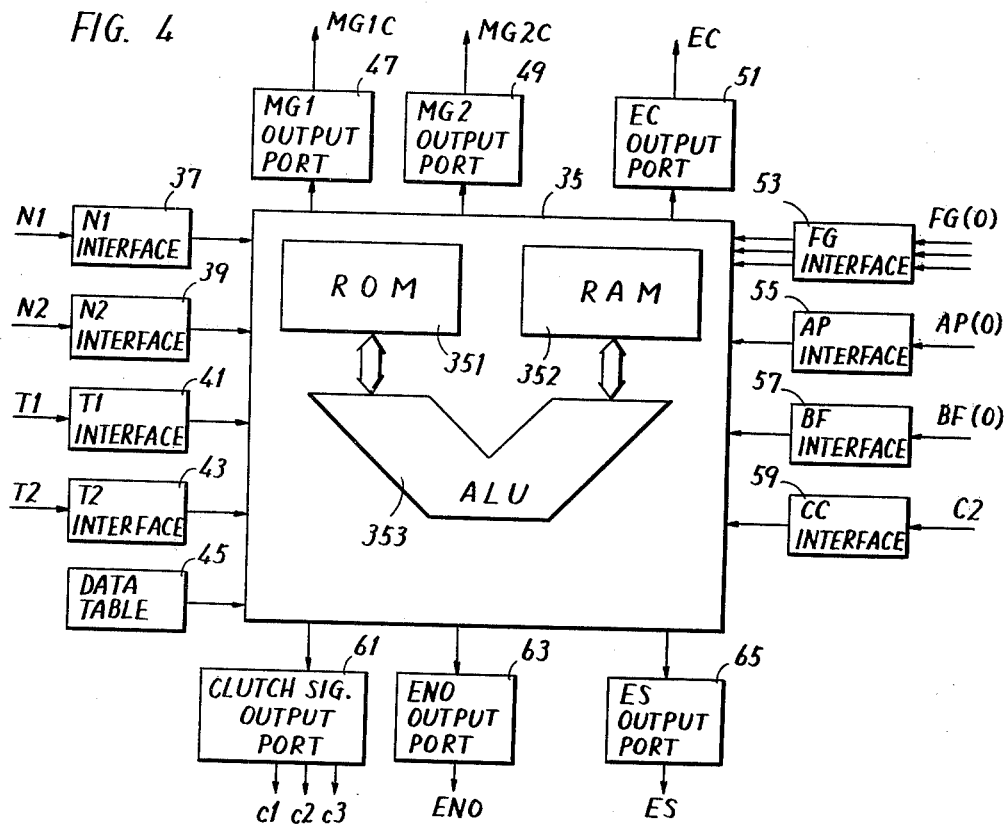

FIG. 2 is another graph for depicting the principle of the present invention, wherein the abscissa indicate the speed of the output shaft of a vehicle and the ordinate indicates the shaft torque. Referring to FIG. 2, the principle of the present invention will be described in detail. More specifically, referring to FIG. 2, within the range of the region ④ (which is an approximate portion of a region of specific fuel consumption (gr/PS·h) which is less than "210 to 230", for example) only the engine is run as a prime mover. The region ④ is defined by an upper limit line of a curve representing a throttle opening degree characteristic running through a portion of the region of the specific fuel consumption being less than 210 to 230 (gr/PS·h), i.e., a line in which the throttle opening is 100%, and a line in which the throttle opening is 50%, and also defined by an upper limit value Neu and a lower limit value Nel of the optimum range of the engine in which the engine will operate with such specific fuel consumption. Only the engine is operated, if the required torque Tr falls within the above described region ④. Region ④ includes a region where fuel consumption is worse than 220 to 230 (gr/PS·h) and furthermore it could happen that some portion is within the range of the fuel consumption being less than 220 to 230 (gr/PS·h) but outside the region ④. The reason is that the curve of the fuel consumption does not necessarily coincide with the characteristic curve representing throttle opening and a region of a better thermal efficiency was selected in an approximate manner in determining the region ④. Meanwhile, it is pointed out that FIG. 2 and FIGS. 8, 9, 10A and 10B to be described subsequently have been illustrated in a simplified manner as compared with FIG. 1 and accordingly these illustrations are not precise in a strict sense, inasmuch as these are referred to only for describing the principle of the present invention.

According to this embodiment, at least one of the two motor/generators used in the hybrid vehicle is run as a motor to provide a prime mover of the vehicle within the regions ① and ② of FIG. 1. Since the region ① is a region where the required torque Tr exceeds the upper limit value of the torque which can be supplied by the above described one motor, the other motor is run to supply the torque deficiency within the above described region ①. Meanwhile, since the region ② is within the torque range where the required torque is attained by the above described one motor, only the above described one motor is used as a prime mover of the vehicle.

The region ③ is a region where the required torque Tr exceeds an upper limit value of the torque range in which the engine can be run considering its fuel consumption characteristic but where the shaft speed of the vehicle is within the range of shaft speeds in which the engine can run. In such a case, the engine is controlled to operate at the upper limit torque of the above described allowed torque range and torque deficiency is supplied by one of the two motors. Although both of the regions ③-1 and ③-2 are included within the region ③, this control occurs such that in the region ③-1 the other motor is operated as a starter motor to start the engine when the engine is stopped.

The region ⑤ is a range wherein the output shaft speed of the vehicle is within the optimum shaft speed range in which the engine can run and wherein the required torque Tr falls between the lower limit of the torque range in which the engine can operate, and zero. In the region ⑤ the engine is operated at the lower limit of the above described allowed torque range as a prime mover of the vehicle and, in order to absorb excessive torque, the one motor/generator out of the above described two motor/generators is operated as a generator.

The regions ⑥ and ⑦ in the FIG. 2 graph shows regions where the required torque is negative (−Tr). In the region ⑥ one motor out of the above described two motors is operated as a generator, thereby to attain a braking torque. However, in the region ⑦ the vehicle has insufficient braking torque when only the above described motor/generator is operated as a generator, and in this case the other motor is also operated as a generator to supply the braking torque deficiency. Meanwhile, when these two motor/generators are operated as generators, it may be considered that a major portion of the generated electric output is regenerated to a battery. Accordingly, by uniquely controlling the vehicle depending on the respective regions shown in the FIG. 2 graph, an improved engine/electric hybrid vehicle is provided wherein the fuel consumption of the engine is minimized and the loss of energy by the two motor/generators is also minimized.

FIGS. 3 to 7 are block diagrams showing one embodiment of the present invention. An engine/electric hybrid vehicle of the embodiment shown comprises one engine 1 and first and second motor/generators 5 and 7. The engine 1 and two motor/generators 5 and 7 are controlled by a microprocessor or microcomputer 35.

The engine 1 may comprise a gasoline engine having a specific fuel comsumption characteristic as shown in FIG. 1, for example. The output shaft of the engine 1 is detachably coupled through a transmission or a clutch mechanism 3 serving as a coupling means to the first motor/generator 5 or the second motor/generator 7. The clutch mechanism 3 comprises three clutches C1, C2 and C3. In the embodiment shown, these clutches C1, C2 and C3 each are implemented by means of an electromagnetic clutch, which is responsive to a signal from a clutch control circuit 21 (to be described subsequently) to selectively disconnect or connect them. The second motor/generator 7 is a motor having a large continuous rating, whereas the first motor/generator 5 is a relatively small sized motor having a relatively short time rating of, e.g., about three minutes. The output shaft of the second motor/generator 7 is coupled through a transmission means such as a differential gear (not shown) to the wheel shaft and thus to wheels (not shown). Thus, a power train of the engine/electric hybrid vehicle of the embodiment shown is established.

Figure 11:
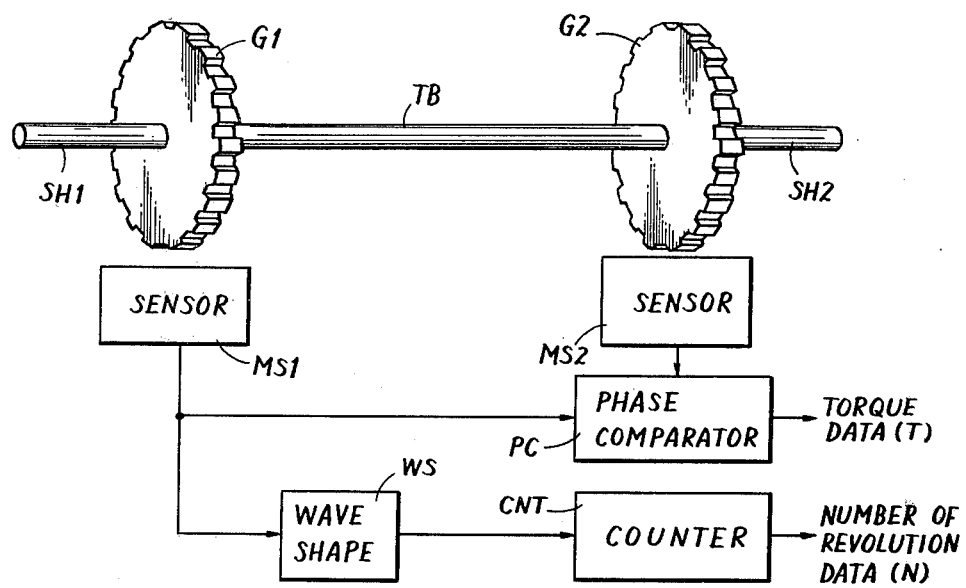
FIG. 11 is a view showing an outline of a preferred embodiment of a means for detecting the torque and the shaft speed.

A speed sensor 9 and a torque sensor 11 are operatively coupled to the output shaft of the engine 1. Similarly, a speed sensor 13 and a torque sensor 15 are operatively coupled to the output shaft of the second motor/generator 7 and thus of the output shaft of the vehicle. These speed sensors 9 and 10 and the torque sensors 11 and 15 may be implemented as any one of various well-known structures. In the embodiment shown, such a structure as shown in FIG. 11 is employed and will be described in detail below. As described previously, the engine 1 may comprise a gasoline engine, for example, to which a throttle control 17 and an engine enabling means 19 are coupled. The throttle control 17 comprises a butterfly valve, for example, for controlling the degree of opening of a carburetor (not shown) and a servomotor or a pulse motor for driving the butterfly valve. The engine enabling means 19 comprises means for connecting a fuel line, an ignition circuit and the like. The engine 1 may be provided with a starter motor serving as a starting means. Where the engine 1 is a diesel engine, the throttle control 17 comprises a butterfly valve (not shown) for adjusting the amount of air being fed into engine cylinders, a control device such as a servomotor (not shown) for an injector pump (not shown) for pressure feeding fuel into cylinders after adjustment of a fuel injection amount, and the like. Likewise, where the engine 1 is a diesel engine, the engine enabling means 19 comprises a means for connecting a fuel line, a means for enabling an injection pump and the like. Although not shown, the engine 1 is further provided with an engine temperature sensor for measuring the temperature of the engine, an oil pressure sensor for measuring the oil pressure of an engine lubricating oil, and the like. Since these temperature and oil pressure sensors are well-known to those skilled in the art, detailed description thereof will be omitted.

The engine temperature sensor is adapted to measure the temperature of water for cooling the engine, for example, such that if the temperature reaches 110° C., for example, the output ET is obtained, indicating that the engine is overheated. The oil sensor is adapted to measure the pressure of the engine oil for lubrication, such that a signal EO is obtained when the pressure becomes smaller than 2 kg/cm². These signals ET and EO are applied to flag lamp drivers to be described subsequently.

The first motor/generator 5 and the second motor/generator 7 are each driven as a motor by electric power from a battery 23 and are each operated as a generator to regenerate the battery 23. The first motor/generator 5 may comprise a direct current series motor/generator. Accordingly, a motor current control 27 is interposed between the first motor/generator 5 and the battery 23 for the purpose of controlling the motor current. The motor current control 27 responds to a signal MG1C (to be described subsequently) to control current flowing through the first motor/generator 5 based on a voltage fed back from a shunt resistor 25. The second motor/generator 7 may comprise a direct current shunt motor/generator, for example. Accordingly, an armature current control 31 for controlling armature current in an armature (not shown) included in the second motor/generator 7, and a field current control 35 for controlling field coil current in a field coil (not shown) included in the second motor/- generator 7 are interposed between the second motor/generator 7 and the battery 23. The armature current control 31 responds to signals MG2C, BF(M) and AP(M) (to be described subsequently) to control the armature current Ia of the second motor/generator 7 based on a voltage fed back from a shunt resistor 29 interposed in the current path. The field current control 35 responds to the speed data N2 obtained from the speed sensor 13 coupled to the output shaft to control current flowing through the field coil based on a voltage fed back from a shunt resistor 33 interposed in the current path.

The field current of the second motor/generator 7 is controlled in response to the shaft speed N2 as described in the following. More specifically, the field current control 35 is structured such that a strengthened field current is applied where the speed N2 is smaller than a predetermined value such as 3000 rpm, a weakened field current is applied where the speed N2 exceeds a predetermined value such as 6000 rpm, and a field current in reverse proportion to the speed N2 is applied when the speed N2 falls between the above described predetermined values of 3000 rpm and 6000 rpm.

The second motor/generator 7 has a larger continuous rating than the first motor/generator 5 and accordingly the second motor/generator 7 is used as a principal motor/generator, whereas the first motor/generator 5 is used as an auxiliary motor/generator. Accordingly, although not shown, the second motor/generator 7 is provided with a temperature sensor, so that if the temperature of the second motor/generator exceeds a predetermined value such as 120° C. a signal MT is obtained, indicating that the second motor/generator 7 has been overheated. It would be apparent that the temperature for providing the signal MT may be different depending on the insulation materials used in the motor/generator 7.

Although not shown, the battery 23 may comprise a voltage sensor for measuring a voltage level of the battery 23, a battery temperature sensor for measuring a temperature of the battery 23, a level sensor for measuring an electrolyte level of the battery 23, and the like. These sensors are implemented in a well-known manner. For example, when the voltage of the battery becomes lower than 1.6 V per unit cell, a signal BVL is provided, indicating an overdischarged state, and conversely, if the voltage of the battery exceeds 2.5 V per unit cell, a signal BVH is provided, indicating an overcharged state. The temperature sensor measures the temperature of an electrolyte stored in the battery case (not shown) of the battery 23 or the temperature of the side surface of the battery case, so that when the temperature exceeds 60° C., for example, a signal BT is provided. Generation of the signal BT means that the battery 23 has been overheated and electricity cannot be charged anymore in the battery 23. On the other hand, the electrolyte level sensor may comprise a float sensor, for example, which is adapted such that a signal BW is provided when the electrolyte stored in the battery case drops below the uppermost ends of the electrode plates disposed in the battery case. The electrolyte level for providing the signal BW may be set such that the signal BW is provided when the electrolyte surface is reduced to slightly above the uppermost end of the electrode plates; however, alternatively the signal BW may be provided even when the electrolyte level comes below the uppermost ends of the electrode plates.

The clutch control 21 is structured such that when signals c1, c2 and c3 (to be described subsequently) are provided, the corresponding clutches C1, C2 and C3 are coupled. The clutch control 21 is also responsive to the signal EC(M) to control the clutch C1 included in the clutch mechanism 3.

The above described throttle control 17 is responsive to a signal EC or AP(E) (to be described subsequently) to control a servomotor for controlling the degree of carburetor opening. The engine enabling means 19 is responsive to a signal ES or EC(M) (to be described subsequently) to connect a fuel line or to enable an ignition circuit, as described previously.

Figure 12:
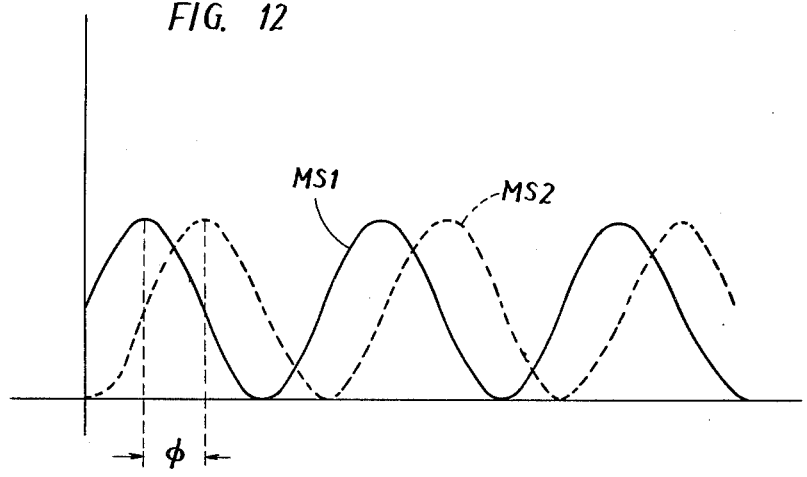
FIG. 12 is a graph showing an example of waveforms for explaining operation of the FIG. 11 device for detecting torque.
Figure 13:
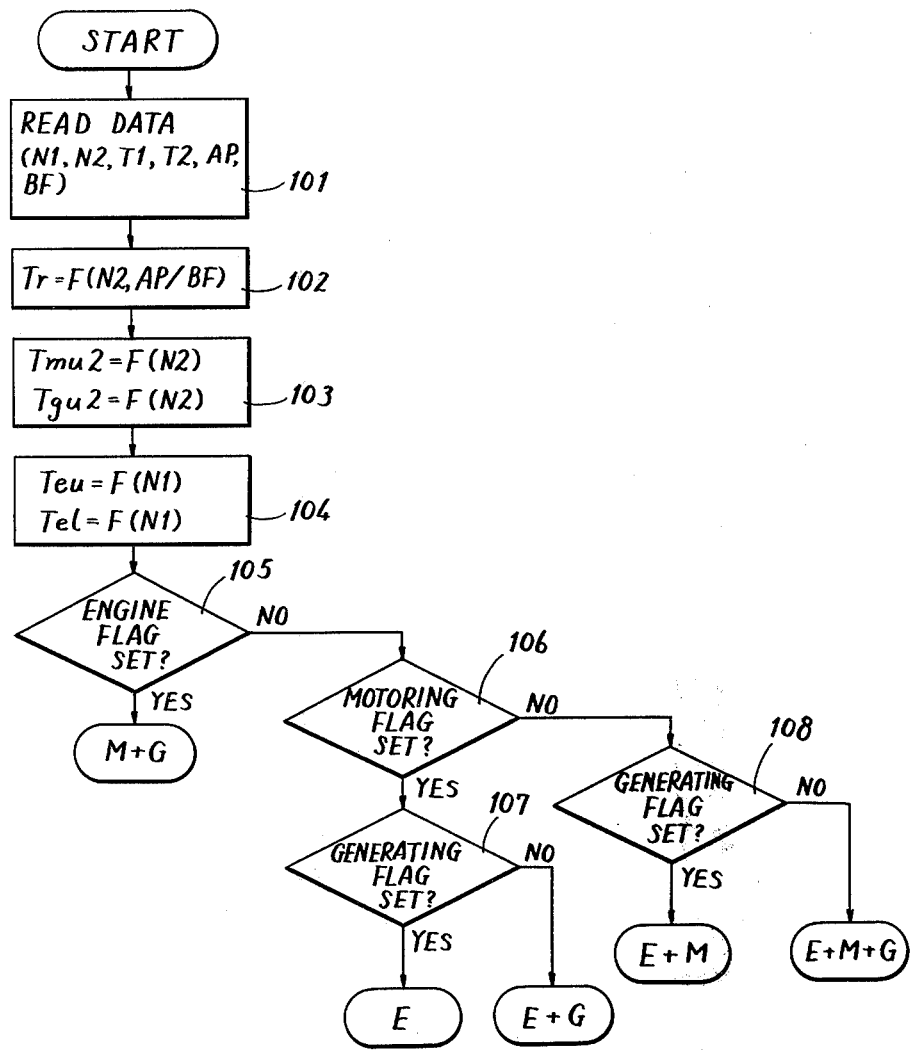
FIGS. 13 to 19 are flow diagrams for explaining an operation of the present invention.
Figure 14:
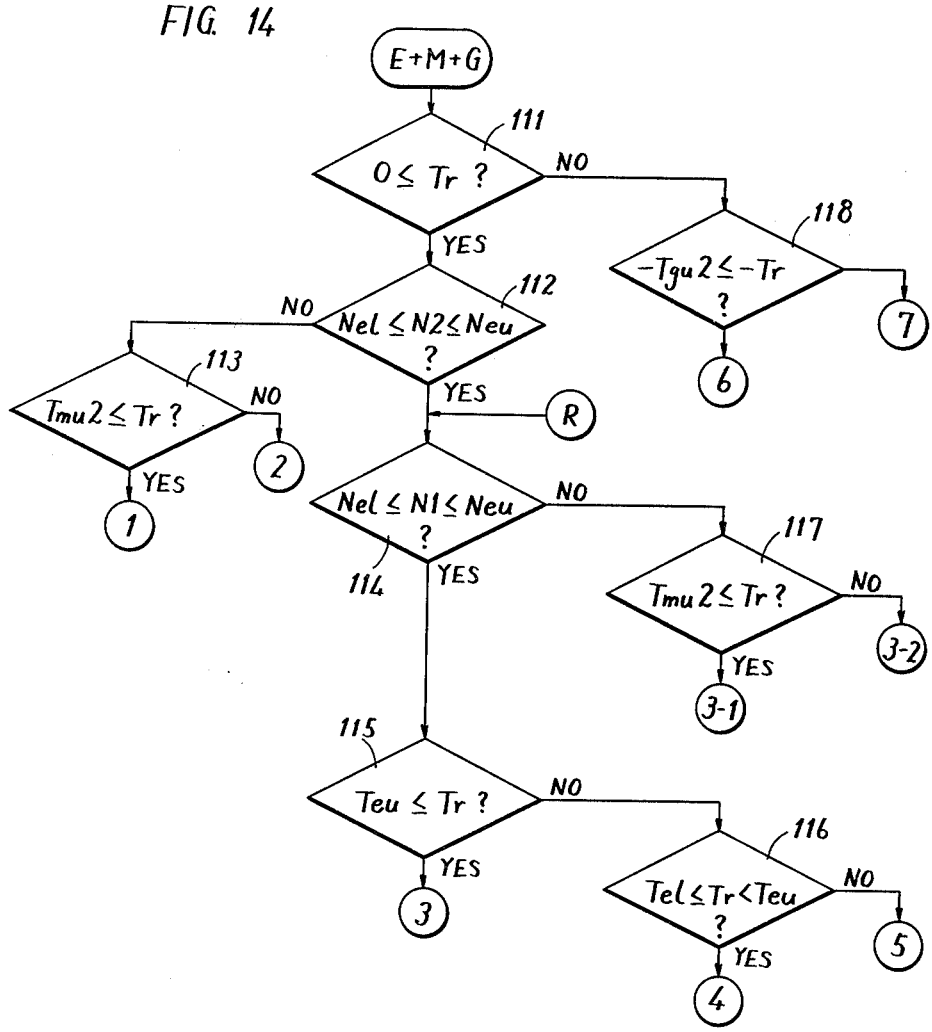

Now referring to FIGS. 11 and 12, the speed sensors 9 and 13 and the torque sensors 11 and 15 will be described. The FIG. 11 embodiment implements both a speed sensor and a torque sensor. The speed torque sensing mechanism comprises shafts SH1 and SH2 and a torsion bar TB coupling these shafts SH1 and SH2. Metallic toothed wheels G1 and G2 are fixed to both ends of the torsion bar TB for integral rotation therewith. The shaft SH1 is coupled to the output shaft of the engine 1 or the second motor/generator 7, whereas the shaft SH2 is coupled to the clutch mechanism 3 or a differential gear (not shown). Magnetic sensors MS1 and MS2 including magnetic resistance elements are provided in the vicinity of the respective peripheral surfaces of the above described metallic toothed wheels G1 and G2. The sensors MS1 and MS2 provides alternating current signals having the waveforms shown in FIG. 12 as the respective toothed wheels G1 and G2 rotate. Since these magnetic sensors MS1 and MS2 and the manner of detection of the speed are well-known to those skilled in the art, a more detailed description thereof will be omitted. The outputs of these magnetic sensors MS1 and MS2 are applied to a phase comparator PC. The alternating current signal output from one magnetic sensor MS1 or the other magnetic sensor MS2 is pulse shaped by a wave shaping circuit WS and is applied to a pulse counter CNT. The phase comparator PC detects torsion, i.e., shaft torque, exerted upon the torsion bar TB, based on the phase difference $\phi$ of these two alternating current signals shown in FIG. 12 and provides the torque data T. The pulse counter CNT counts the number of pulses to thereby process them using a predetermined constant, to provide the speed data N. By coupling such a speed/torque sensing mechanism to the output shaft of the engine 1, the torque data T1 is obtained from the phase comparator PC and the speed data N1 is obtained from the counter CNT. Likewise, by coupling the speed/torque sensing mechanism to the output shaft of the second motor/generator 7, the torque data T2 is obtained from the phase comparator PC and the speed data N2 is obtained from the counter CNT.

As is well-known, the microcomputer 35 comprises a read only memory 351, a random access memory 352 and an arithmetic logic unit 353. The microcomputer 35 is coupled to input interfaces 37, 39, 41, 43, 53, 55, 57 and 59 and to output ports 47, 49, 51, 61, 63 and 65. The interface 37 receives the speed data N1 obtained from the engine speed sensor 9 as an analog voltage and provides the same to the microcomputer 35. Likewise, the interface 39 receives the speed data N2 obtained from the output shaft speed sensor 13 as an analog voltage and provides the same to the microcomputer 35. The interfaces 41 and 43 receive the torque data T1 obtained from the engine shaft torque sensor 11 as an analog voltage and the torque data T2 obtained from the output shaft torque sensor 15 as analog voltages and provide the same to the microcomputer 35. The input interface 53 receives the output from a flag control circuit 79 (FIG. 7) (to be described subsequently) (each of which is a signal FG(O) represented by the high level or the logic one or the low level or the logic zero) and provides the same to the microcomputer 35. Meanwhile, it is to be noted that (O) denotes a signal generated upon the selection of an automatic operation mode in the following description. Likewise, (M) denotes a signal generated upon the selection of a manual operation mode. Furthermore, (E) denotes a signal generated where the engine mode is selected in the manual operation mode. The interface 55 receives a signal AP(O) obtained as an analog voltage from a switching circuit 77 (to be described subsequently) and provides the same to the microcomputer 35. The interface 57 receives a signal BF(O) obtained as an analog voltage from the switching circuit 77 and provides the same to the microcomputer 35. The clutch control 21 (FIG. 3) comprises a means, such as a microswitch, for providing a signal c2 which indicates when the clutch C2 included in the clutch mechanism 3 is operated, i.e., is in a coupled state, and the signal c2 in the form of a binary signal is applied through the interface 59 to the microcomputer 35.

The output port 47 provides a signal MG1C for controlling the motor current control 27 for the first motor/generator 5. The signal MG1C is obtained as an analog voltage. Accordingly, the motor current control 27 (implemented as a well-known thyristor chopper, for example) is responsive to the analog voltage to vary the conduction angle of the thyristor, to thereby control current flowing through the first motor/generator 5. The output port 49 provides a signal MG2C for controlling the armature current control 31 for the second motor/generator 7. The signal MG2C is likewise obtained as an analog voltage. Accordingly, the armature current control 31 (implemented as a well-known thyristor chopper) is responsive to the voltage signal MG2C to control current flowing through the armature (not shown) of the second motor/generator 7. The output port 51 provides a signal EC to the throttle control 17. The signal EC is also obtained as an analog voltage, so that the servomotor (not shown) included in the throttle control 17 responds to the voltage signal EC to control the degree of opening TP of the carburetor (not shown). The output port 61 provides the clutch signals c1, c2 and c3. These signals c1, c2 and c3 are each obtained as a binary signal and are applied to the clutch control 21. Accordingly, the clutch control 21 brings the respective corresponding clutches C1, C2 and C3 included in the clutch mechanism 3 in a connected state, if these signals c1, c2 and c3 are obtained from the output port 61 as the high level or the logic one and brings the respective corresponding clutches C1, C2 and C3 in a disconnected state, if these signals c1, c2 and c3 are the low level or the logic zero. The output port 63 provides the signal ENO. The signal ENO is obtained as a binary signal if the microcomputer 35 determines that the engine 1 is incapable of operating. More specifically, if the engine 1 is out of order for some reason, the microcomputer 35 provides the signal ENO for preventing the engine 1 from running and provides the same to a flag control 79 to be described subsequently. The output port 65 provides the signal ES. The signal ES is provided as a binary signal to the engine enabling means 19. Accordingly, if the signal ES is the high level or the logic one, the engine enabling means 19 enables the fuel line or the ignition circuit of the engine 1 and, when the signal ES is the low level or the logic zero, the engine enabling means 19 disables the engine.

The microcomputer 35 is coupled to a data table 45 for providing a signal for controlling the engine 1 and the motor/generators 5 and 7 together with various parameters. The data table 45 comprises a read only memory implemented by semiconductor devices, matrix circuits and the like. The data table 45 will be described in more detail subsequently with reference to the associated figures.

Figure 5:
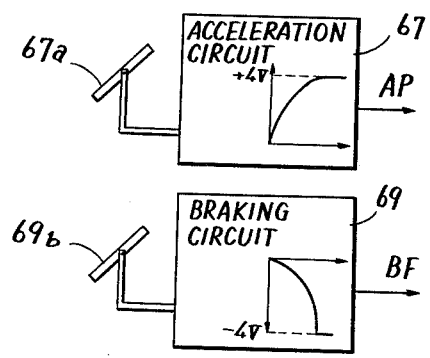

Referring to FIG. 5, the engine/electric hybrid vehicle shown comprises an accelerating pedal 67a and a braking pedal 69b. The accelerating pedal 67a is coupled to an accelerating circuit 67. An accelerating circuit 67 comprises a potentiometer for generating a voltage which varies as a function of the depression or displacement of accelerating pedal 67a, to thereby provide a voltage signal AP representing the above described displacement amount of the accelerating pedal 67a. On the other hand, the braking pedal 69b is coupled to a braking circuit 69. The braking circuit 69 comprises a pneumatic circuit for applying a braking force, a pressure sensor of a pneumatic circuit and the like as well as a piezoelectric device for generating a voltage which varies as a function of depression force on the braking pedal 69b, i.e., as the pressure of the braking pneumatic circuit. The braking circuit 69 further comprises a constant voltage element saturating the voltage at a given level and holding it constant. Accordingly, the braking circuit 69 provides a voltage signal BF in association with the depression force of the braking pedal 69b.

Figure 6A:
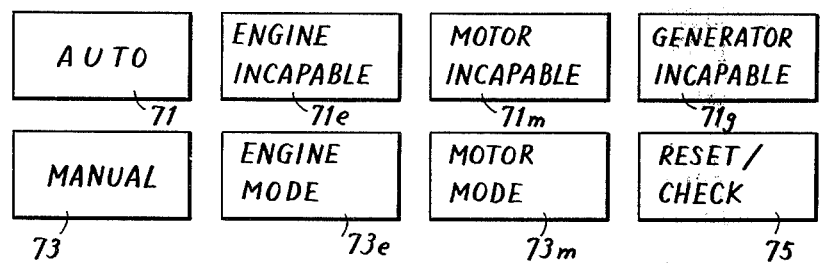

An instrument panel (not shown) of a dashboard (not shown) of the vehicle in this embodiment comprises display lamp combined switches 71, 73, 73e, 74m and 75 and display lamps 71e, 71m and 71g shown in FIG. 6A. The switch 71 is a switch for selectively setting an automatic control mode for controlling the engine 1 and the motor/generators 5 and 7 by the microcomputer 35. The switch 37 is a switch for selectively setting a manual control mode for manually controlling the engine 1 and the motor/generators 5 and 7 without reliance on the microcomputer 35. These switches turn on the combined lamps when the switches are set. The display lamps 71e, 71m and 71g are intended to display that either the engine, the motors, or the generators are incapable of operating. More specifically, if the lamp 71e is lighted, this means that the engine 1 is incapable of operating. If the lamp 71m is lighted, this means that the first and second motor/generators 5 and 7 are incapable of operating as motors in a motoring mode. If the lamp 71g is lighted, this means that the first and second motor/generators 5 and 7 are incapable of operating as generators in a generating mode in the automatic control mode. If the manual switch 73 is selected, the engine mode or the motoring mode is further selected by the switch 73e or 73m. More specifically, if the switch 73 is operated and the switch 73e is operated, the engine 1 is responsive only to the signal AP from the accelerating circuit 67 (FIG. 5) without reliance upon the microcomputer 35. If the switch 73 is operated and the switch 73m is operated, only the second motor/generator 7 is allowed to operate and the armature current thereof is controlled only in response to the signal AP obtained from the accelerating circuit 67 or to the signal BF obtained from the braking circuit 69 without reliance on the microcomputer 35. For selecting the automatic control mode or the manual control mode, the switching circuit 77 shown in FIG. 6B is provided.

Figure 6B:
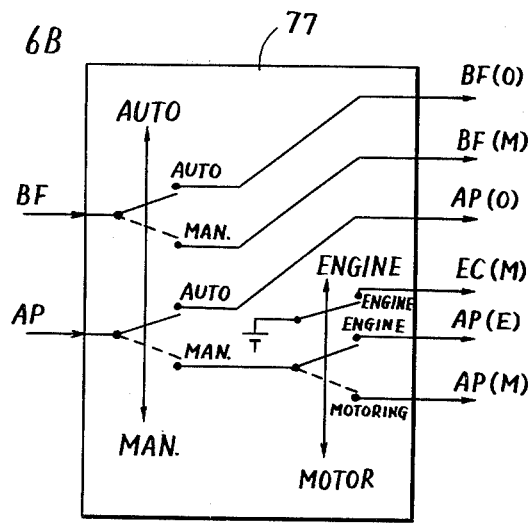

Referring to FIGS. 6A and 6B, the switching circuit 77 comprises the contacts of the switches 71, 73, 73e and 73m shown in FIG. 6A. The switching circuit 77 receives the voltage signal AP obtained from the accelerating circuit 67 and the voltage signal BF obtained from the braking circuit 69 shown in FIG. 5. If the switch 71 shown in FIG. 6A is operated, the inputted signals AP and BF are withdrawn through the contacts for the automatic control mode from the circuit 77 as the voltage signals AP(O) and BF(O). These signals AP(O) and BF(O) are applied to the interfaces 55 and 57 of the microcomputer 35, respectively. If the switch 73 shown in FIG. 6A is operated, the voltage signal BF is withdrawn through the contract for the manual operation mode from the switching circuit 77 as the signal BF(M). The signal BF(M) is applied to the armature current control 31, as described previously. If the switches 73 and 73e shown in FIG. 6A are operated, the signal AP is withdrawn through the contact for the manual control mode and the contact for the engine operation mode from the switching circuit 77 as the signal AP(E). The signal AP(E) is applied to the throttle control 17, as described previously. Referring to FIG. 6A, if the switches 73 and 73m are operated, the signal AP is withdrawn through the contact for the manual control mode and the contact for the motoring mode from the switching circuit 77 as the signal AP(M). The signal AP(M) is applied to the above described armature current control 31. If the switches 73 and 73e in FIG. 6A are operated, the signal EC(M) is withdrawn through the contact for the engine mode from the switching circuit 77. The signal EC(M) is applied to the engine enabling means 19. More specifically, in the manual control mode and in the engine operation mode, a particular signal required for enabling the enabling means 19 of the engine 1 is withdrawn as a signal EC(M) from the switching circuit 77.

Figure 7:
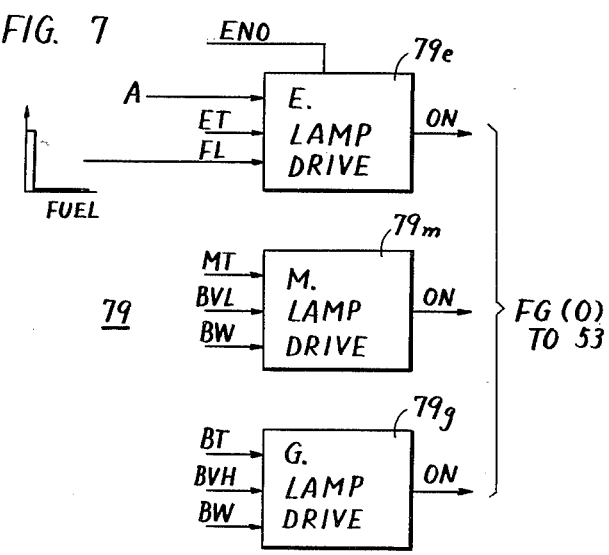

FIG. 7 shows a flag control 79 including driving circuits 79e, 79m and 79g for display lamps 71e, 71m and 71g, respectively. More specifically, if the signals are obtained from the driving circuits 79e, 79m and 79g, the corresponding lamps 71e, 71m and 71g are lighted, respectively. As a result, the mode which is incapable of operation is displayed. The signals obtained from these driving circuits 79e, 79m and 79g are applied to the previously described interface 53 as flag signals. The driving circuit 79e comprises an OR gate, for example, for receiving the signal ENO obtained from the output port 63 (FIG. 4), the signal ET obtained from the engine 1, the signal FL and the signal A. The signal ENO indicates that the engine is incapable of operating in the automatic control mode, the signal ET is a signal indicating that the engine temperature exceeds a predetermined value, and the signal FL is a signal indicating that the fuel level has become lower than a predetermined value. The amount of the fuel remaining when the signal FL is obtained varies, depending on the geometry of a fuel tank (not shown) and a fuel sensor may be structured such that the output becomes high when the remaining fuel is less than five liters, for example. The signal A is a logical product of the signal N1 obtained from the engine speed sensor 9 and the signal EO obtained from the engine 1. More specifically, the signal A is high if the speed of the engine 1 has reached a certain value and the oil pressure of the engine lubricant drops below a predetermined value. The driving circuit 79m receives the signals MT, BVL and BW. The signal MT is a signal indicating that the temperature of the second motor/generator 7 exceeds a predetermined value, the signal BVL is a signal indicating that the battery 23 is in an overdischarged state, and the signal BW is a signal indicating that the electrolyte level of the battery 23 has dropped below a predetermined value, and these signals are high. The driving circuit 79m is responsive to any of these signals to provide a high level output and to that end comprises an OR gate. The driving circuit 79g receives the signals BT, BVH and BW. The signal BT becomes high if the temperature of the battery 23 exceeds a predetermined value, and the signal BVH becomes high if the battery 23 becomes overcharged. The signal BW is the same as described previously. The driving circuit 79g provides the high level output if any of these signals is obtained and to that end comprises an OR gate.

The data table 45 is loaded with a plurality of tables based on the graphs shown in FIGS. 2 and 8 to 10. The data table 45 is loaded with information concerning the respective inherent variable data associated with the characteristics of the above described two motor/generators 5 and 7 and the engine 1. As regards the FIG. 2 graph, the data concerning the output shaft speed of the vehicle and the required torque determinable thereby is set in accordance with FIG. 2.

Figure 8:
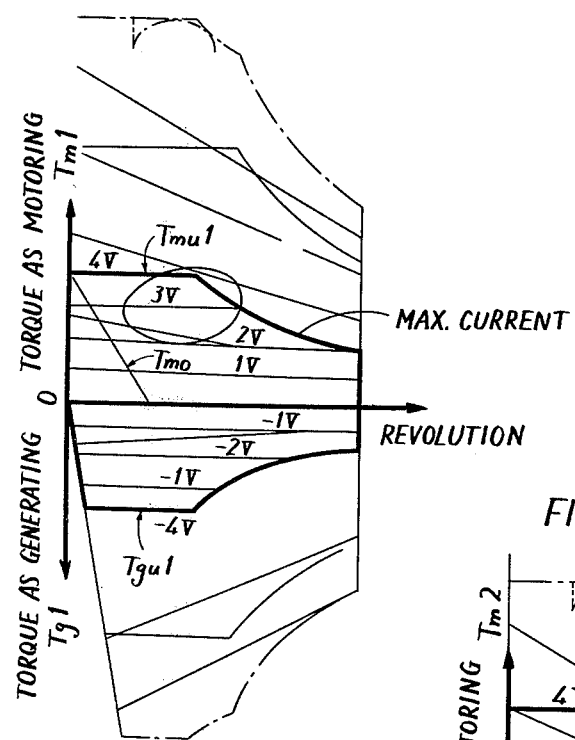
FIG. 8 is a graph showing the relation of a variable with respect to shaft speed and the torque Tm1, Tg1 of a first motor/generator, wherein the abscissa indicates the speed and the ordinate indicates the torque.

FIG. 8 is a graph showing one example of the relationship between the motoring torque Tm1 and the generating torque Tg1 with respect to the speed of the first motor/generator 5. In placing the first motor/generator 5 in a motoring mode, it is defined that if the motor control data provided from the microcomputer 35 to the output port 47 is a maximum such as 4 V, the motoring torque Tm1 is a predetermined upper limit value Tmu1. Accordingly, referring to the graph shown in the motor current control 27 of FIG. 3, if the input signal voltage MG1C is 4 V, for example, the first motor/generator 5 would be operated at the upper limit value Tmu1 of its motoring torque. In placing the first motor/generator 5 in a generating mode, assuming that the maximum of the generator control data provided from the microcomputer 35 to the output port 47 when the maximum pressure value preset by the pneumatic braking system included in the braking circuit 69 is perhaps −4 V, the generating torque Tg1 is then defined as the upper limit value Tgu1. Accordingly, referring to the graph of the motor current control 27 shown in FIG. 3, if the input signal voltage MG1C is −4 V, for example, the first motor/generator 5 would be operated at the upper limit value −Tgu1 of its generating torque. The data table 45 is responsive to demands from the microcomputer 35 to provide to the microcomputer 35 any necessary variable (or data representing the same) for attaining these torques Tm1 and Tg1.

Figure 9:
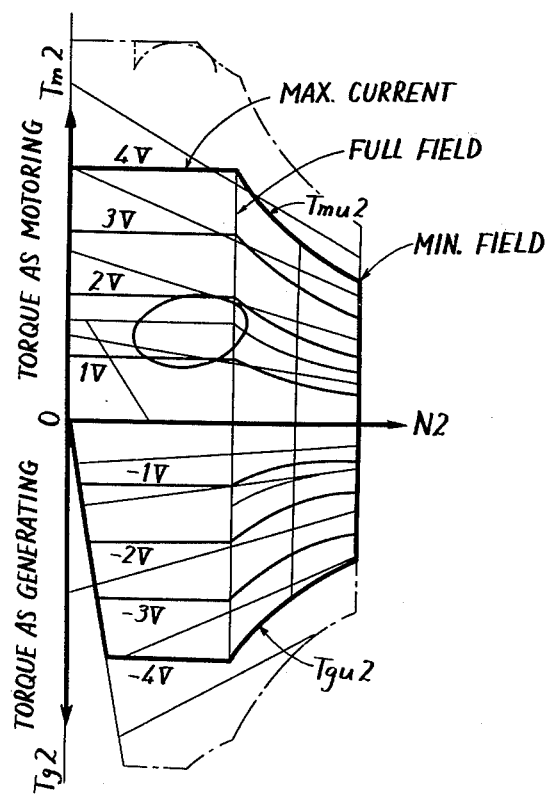
FIG. 9 is a graph showing the relation of a variable with respect to shaft speed and the torque Tm2, Tg2 of a second motor/generator, wherein the abscissa indicates the speed and the ordinate indicates the torque.

FIG. 9 is a graph showing an example of the relation between the motoring torque Tm2 and the generating torque Tg2 with respect to the speed of the second motor/generator 7. In placing the second motor/generator 7 in a motoring mode, it is defined that when the motor control data provided from the microcomputer 35 to the output port 49 is a maximum such as 4 V, the motoring torque Tm2 is a predetermined upper limit value Tmu2. Accordingly, referring to the graph of the armature current control 31 shown in FIG. 3, the control 31 provides the armature current Ia necessary for the second motor/generator 7 to operate with its upper limit torque Tmu2 when the voltage signal MG2C applied thereto is +4 V. In placing the second motor/generator 7 in a generating mode, it is defined that the generator control data provided from the microcomputer 35 to the output port 49 when the maximum pressure value as preset by the pneumatic braking system included in the braking circuit 69 is a maximum, such as −4 V, the generating torque Tg2 is a predetermined upper limit value Tgu2. Accordingly, referring to the graph of the armature current control 31 shown in FIG. 3, if the input signal voltage MG2C is −4 V, for example, the second motor/generator 7 would be operated at the upper limit value −Tgu2 of its generating torque. The data table 45 is responsive to demands from the microcomputer 35 to provide to the microcomputer 35 the variable voltage (or the data representing the same) necessary for attaining such torque Tm2, Tg2.

Figure 10A:
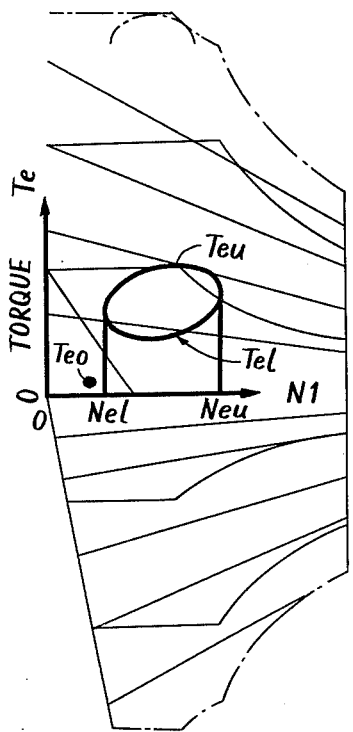
FIG. 10A is a graph showing the relation of the degree of throttle opening with respect to shaft speed and torque Te of the internal combusion engine.
Figure 10B:
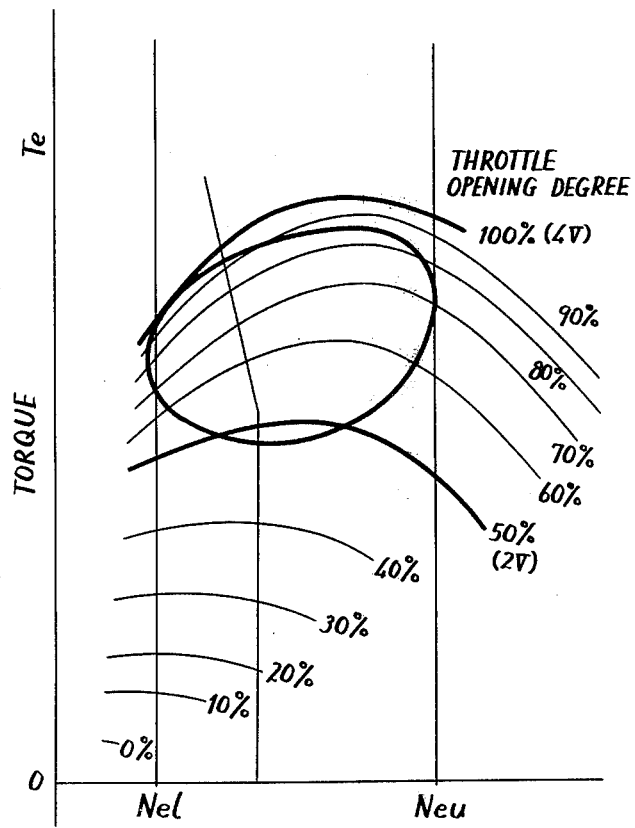
FIG. 10B is an enlarged portion of the FIG. 10A graph.

FIG. 10A is a graph showing one example of the relation between the torque Te and the speed of the engine 1 and FIG. 10B is a graph showing in an enlarged manner a necessary portion of the FIG. 10A graph. In the embodiment shown, the torque range in which the engine 1 can operate is bounded by a predetermined upper limit value Teu (when the throttle controlled by the throttle control 17 is 100% open) and a predetermined lower limit value Tel (when the degree of throttle opening is 50%). Accordingly, in the embodiment shown, the range of the engine torque Te in which the engine can operate is between the lower limit Tel and the upper limit Teu of the torque with respect to the speed range from the lower limit Nel to the upper limit Neu. Accordingly, the throttle control 17 shown in FIG. 3 drives the servomotor so that the degree of throttle opening becomes 100% if the voltage signal EC provided from the output port 51 of the microcomputer 35 is, e.g., 4 V and also drives the servomotor so that the degree of throttle opening may be 50% if the signal voltage EC is 2 V, for example. As described previously, although the range from the lower limit Tel to the upper limit Teu of the engine torque approximately covers a specific fuel consumption shown in FIG. 1 of 220 gr/PS.h, for example, this range also partially includes a portion in which a specific fuel consumption is less than that. The reason is that for simplicity of control the lower limit of the degree of throttle opening was set to 50%. The data table 49 is responsive to the demand from the microcomputer 35 to provide to the microcomputer 35 the control voltage (or the data representing the same) corresponding to the degree of throttle opening (%) necessary for an arbitrary engine torque Te within the range in which the engine is permitted to operate.

Now that the structural features of the preferred embodiment of the present invention have been described, the operation thereof will be described with reference to the flow diagrams shown in FIGS. 13 to 19.

At the outset, operation in the automatic control mode will be described. In the automatic control mode, at the first step 101 the microcomputer 35 reads the respective data pieces N1, N2, T1, T2, AP(O) and BF(O) from the interfaces 37, 39, 41, 43, 55 and 57 shown in FIG. 4, respectively. More specifically, the shaft speed N1 of the engine is provided from the interface 37, and the shaft speed N2 of the second motor/generator 7 is provided from the interface 39. The shaft torque T1 of the engine 1 is provided from the interface 41 and the shaft torque T2 of the second motor/generator 7 is provided from the interface 43. The voltage AP(O) corresponding to the depression amount of the accelerating pedal 67a (FIG. 5) is provided from the interface 55, and the voltage BF(O) corresponding to the depression of the braking pedal 69b (FIG. 5) is provided from the interface 57.

At the following step 102 the microcomputer 35 responds to the read data to refer to the data table 45, to thereby evaluate the required torque required for the hybrid vehicle at that time. More specifically, the required torque Tr is read in response to the voltage signals AP(O) or BF(O). For example, assuming that the accelerating pedal 67a has been fully depressed, the voltage signal AP(O) such as +4 V (representing the maximum depression state) must have been provided from the accelerating circuit 67. Assuming that the maximum +4 V signal AP(O) has been provided, the microcomputer 35 determines the full accelerating state in FIG. 2 and reads the required torque based on the relation of the torque with respect to the output shaft speed N2 (which is the same as the shaft speed of the second motor/generator 7 in this case). In other words, the data of the required torque Tr at a given point (determinable by the speed N2) on the line showing the full accelerating state in FIG. 2 is read. More specifically, the microcomputer 35 is responsive to the magnitude of the obtained voltage signal AP(O) to read the data of the required torque Tr from the point on the line determined by the above described voltage. The same applies where the data concerning the required torque Tr is read based on the voltage signal BF(O). Thus the microcomputer 35 evaluates the data concerning the required torque Tr at the step 102 and then the microcomputer 35 again refers to the data table 45 to evaluate the upper limit value Tmu2 of the motoring torque and the upper limit value −Tgu2 of the generating torque of the second motor/generator 7 determined by the output shaft speed N2 of the vehicle at that time. More specifically, referring to FIG. 9, the upper limit value Tmu2 of the motoring torque and the upper limit value −Tgu2 of the generating torque determined by the speed N2 are read. Then at the following step 104 the microcomputer 35 refers to the data table 45 to read the upper limit value Tue and the lower limit value Tel of the engine torque on that occasion based on the data of the shaft speed N1 of the engine 1 at that time. More specifically, referring to FIG. 10, the upper limit value Teu and the lower limit value Tel of the engine torque determined by the revolution number N1 are read. Meanwhile, the microcomputer 35 has already read from the interface 53 the signals representing the respective flag states. More specifically, the signal from the flag control 79 shown in FIG. 7 has been provided through the interface 53 to the microcomputer 35. For example, assuming that the engine is incapable of operating at that time, the signal of the high level or the logic one would have been provided from the driving circuit 79e for enabling the lamp 71e (FIG. 6A). At the following steps 105 to 108 the microcomputer 35 responds to the signal obtained from the above described interface 53 to determine the states of the respective flags i.e. the engine flag, the motoring flag and the generating flag, to thereby determine the operation mode which can presently be used.

More specifically, at the step 105 the microcomputer first determines whether the engine flag has been set. In other words, the microcomputer 35 determines whether the signal obtained from the driving circuit 79e (FIG. 7)

is the high level or the logic one. If the decision at the step 105 is "YES", this means that at least one of the signals ENO, A, ET, FL has been provided to the driving circuit 79e and, since in such a case the engine 1 cannot operate, the vehicle can only operate in the motoring mode or the generating mode as a matter of course.

If the decision at the previous step 105 is "NO", this means that the engine 1 is capable of operating and at the following step 106 the microcomputer 35 then determines whether the motoring flag has been set. More specifically, it is determined whether the signal obtained from the driving circuit 79m is the high level or the logic one. If the decision at the step 106 is "YES", this means that at least one of the signals MT, BVL and BW has been inputted to the driving circuit 79m and at that time operation in the motoring mode is prohibited. Accordingly, at the following step 107 the microcomputer 35 determines whether the generating flag has been set. More specifically, it is determined whether the signal obtained from the driving circuit 79g is the high level or the logic one. If the decision at the step 107 is "YES", this means that at least one of the signals BT, BVH and BW has been inputted to the driving circuit 79g and in this case operation in the generating mode is prohibited. Accordingly, where the decision at the step 107 is "YES", this means that only operation of engine 1 remains permissible. If the decision at the step 107 is "NO", it follows that operation is permitted in the engine mode and/or the generating mode, but not in the motoring mode.

If the decision at the previous step 106 is "NO", this means that operation is permitted at least in the engine mode and/or the motoring mode and the microcomputer 35 determines at the following step 108 whether the generating flag has been set as in the case of the previous step 107. If the decision at the step 108 is "YES", this means that operation is permitted in the remaining engine mode and/or motoring mode, but not the generating mode. Conversely, if the decision at the step 108 is "NO", this means that operation in all the modes is permitted.

Thus, the microcomputer 35 determines which mode can be used when the switch 71 shown in FIG. 6A is operated or is in the automatic control mode. If it is determined that either the engine mode, the motoring mode, or the generating mode is prohibited, then the program proceeds to the steps following "E+M+G". If it is determined that operation in either the motoring mode or the engine mode is prohibited, then the program shifts to the steps following "M+G". If it is determined that operation is prohibited in either the motoring mode or the generating mode, then the program shifts to the steps following "E". If it is determined that operation is prohibited in the motoring mode, then the program shifts to the steps following "E+G". If it is determined that operation is prohibited in the generating mode alone, then the program shifts to the steps following "E+M". The above described respective cases will be further described below.

Now referring to FIGS. 14, and 15A to 15D, a general state in which operation is permitted in all the modes will be described. In such a case, at the first step 111 the microcomputer 35 determines whether the required torque Tr evaluated at the previous step 102 is positive. More specifically, it is determined whether the required torque is a driving torque or a braking torque. A positive torque means a driving torque and a negative torque means a braking torque. If the decision at the step 111 is "YES", this means that the required torque Tr is positive and at the following step 112 the microcomputer 35 further determines whether the output shaft speed N2 of the vehicle (which is the same as the shaft speed of the second motor/generator 7 in this case) is in the predetermined speed range of the engine 1 shown in FIG. 10, i.e. is between the lower limit value Nel and the upper limit value Neu. The step 112 is designed to positively bring the engine 1 into operation if the output shaft speed N2 is within the speed range in which the engine 1 is permitted to run and therefore if the decision at the step 112 is "NO" this means that the state is outside regions ③, ④ and ⑤ in FIG. 2. In such a case, since the required torque Tr is positive, the operation region in such a case must be in either region ① or ②. Therefore, at the following step 113 it is determined whether the required torque Tr exceeds the upper limit value Tmu2 of the motoring torque of the second motor/generator evaluated at the step 103. More specifically, if the decision at the step 113 is "YES", this means that operation in the region ① is required, whereas if the decision at the step 113 is "NO", this means that operation in the region ② is required.

The "YES" decision at the previous step 112 means that the output shaft speed of the vehicle is within the above described range of speeds in which the engine 1 is permitted to operate, and at the following step 114 the microcomputer 35 further determines whether the engine shaft speed N1 of the engine 1 read at the previous step 101 is within the permissible operation range, i.e. is between the lower limit Nel and the upper limit Neu. A "YES" decision at the step 114 means that operation of the engine 1 is actually permissible. Therefore, the microcomputer 35 determines at the following step 115 whether the required torque Tr at that time exceeds the upper limit value Teu of the engine torque evaluated at the previous step 104. More specifically, it is determined at the step 115 whether operation should be in region ③ or in regions ④ or ⑤ in FIG. 2. Accordingly, if the decision at the step 115 is "YES", this means that operation in the region 3 is required. Conversely, if the decision at the step 115 is "NO", the microcomputer 35 determines at the following step 116 whether the required torque Tr is within the torque range in which the engine 1 is permitted to operate, i.e. whether the required torque Tr is between the lower limit value Tel and the upper limit value Teu of the engine torque. In other words, it is determined at the step 116 whether the operation presently required is within region ④ or region ⑤ in FIG. 2. Accordingly, if the decision at the step 116 is "YES", this means that operation in region ④ is required. Conversely, if the decision at the step 116 is "NO", then this means that operation within region ⑤ is required.

If the decision at the previous step 114 is "NO", this means that the engine 1 is operating faster than an idle or is stopped at that time, in spite of the fact that the output shaft speed N2 of the vehicle is within the speed range in which operation of the engine is permitted. Accordingly, at the following step 117 the microcomputer 35 determines whether the required torque Tr exceeds the upper limit value Tmu2 of the motoring torque of the second motor/generator 7. Necessity of decision at the step 117 will be described in the following. Since the engine 1 is either idling or stopped, it is necessary to use the first motor/generator 5 to start the engine 1 as necessary. Accordingly, the driving torque can be obtained only if the second motor/generator 7 is operated, and therefore it is determined whether the required torque Tr exceeds the upper limit value Tmu2 of the motoring torque of the second motor/generator 7. If the decision at the step 117 is "YES", this means that operation should be within the region ③-1 of the region ③ shown in FIG. 2. Conversely, if the decision at the step 117 is "NO", this means that operation in the region ③-2 is required.

The decision at the step 111 as "NO" means that the required torque in such a case is negative. More specifically, it is determined that the required torque Tr is a braking torque. Accordingly, the microcomputer 35 determines at the following step 118 whether the negative required torque −Tr exceeds the upper limit value −Tgu2 of the generating torque of the second motor/generator 7. In other words, it is determined at the step 118 whether the required braking torque can be attained only by the second motor/generator 7 or whether the generating torque by the first motor/generator 5 is further required. Accordingly, a "YES" decision at the step 118 means that operation in the region ⑥ in FIG. 2 is required and conversely a "NO" decision at the step 118 means that operation in the region ⑦ in FIG. 2 is required.

Thus it is determined in which of the respective regions shown in FIG. 2 operation is presently required. In the following the methods of control for operation in each of the respective regions will be described with reference to FIGS. 15A to 15D.

Figure 15A:
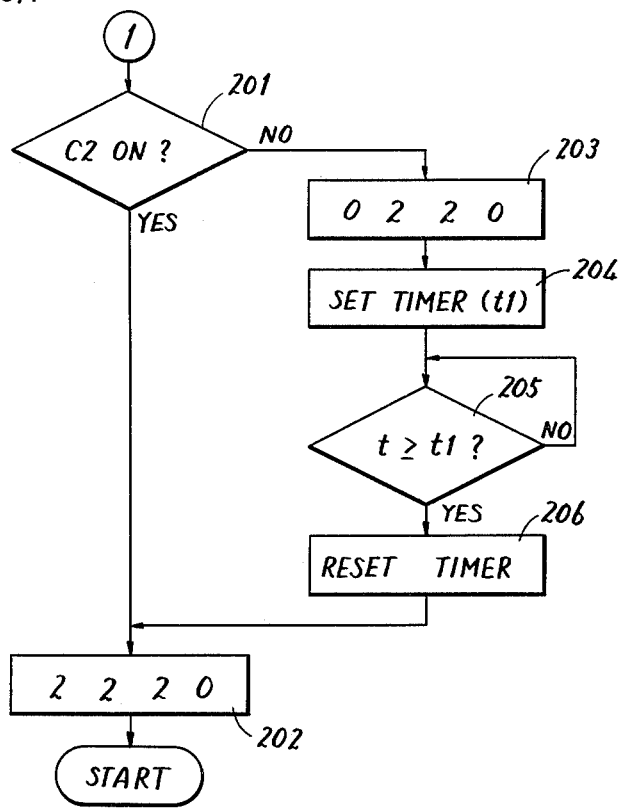

Referring to FIG. 15A, there is shown a case of the region ①, i.e. a case where the engine 1 is not used as a prime mover but the required torque Tr is to be attained by a combination of the second motor/generator 7 and the first motor/generator 5. In such a case the microcomputer 35 determines at the step 201 from the interface 59 and thus from the clutch control 21 whether the clutch C2 included in the clutch mechanism 3 is in a connected state. The decision step 201 is required, because if the clutch C2 is not in a connected state it is impossible to immediately provide a command to the first and second motor/generators 5 and 7. The reason is that at the end of the previous control state the first motor/generator 5 is not necessarily in an operating state and, unless the first motor/generator 5 is already operating, an attempt to immediately connect the first motor/generator 5 to the second motor/generator 7 (which is rotating at the speed N2) might damage the clutch C2. Furthermore, if the clutch C2 is connected in such a situation, a shock is caused in the vehicle and jolts the operator. For the above described reasons, in performing an operation in the region ①, it is first determined whether the clutch C2 for connecting the first and the second motor/generators 5 and 7 is in a connected state. If the clutch C2 is in a connected state, i.e. if the decision at the step 201 is "YES", then the microcomputer 35 provides at the step 2 2 the command "2 2 2 0" to the respective corresponding output ports. Such command is shown in the table. More specifically, the first digit character is a command to the output port 61, the second digit character is a command to the output port 47, the third digit character is a command to the output port 49, and the fourth digit character is a command to the output port 51. Meanwhile, these commands are maintained until the following commands are outputted. Accordingly, at the step 202 the microcomputer 35 provides a command for connecting only the clutch C2 to the output port 61. Therefore, only the signal c2 is obtained as the high level or the logic one from the output port 61 and accordingly the clutch control 21 places only the clutch C2 included in the clutch mechanism 3 in a connected state. The microcomputer 35 also provides to the output port 49 a command to operate the second motor/generator 7 in a motoring mode at the upper limit value Tmu2 of its motoring torque. Accordingly, the voltage signal MG2C for operating the second motor/generator 7 at the upper limit value Tmu2 of its motoring torque is provided from the output port 49 as a maximum value such as 4 V to the armature current control 31. Therefore, the armature current control 31 operates such that a current to the armature of the second motor/generator 7 from the battery 23 is sufficient to attain the upper limit value Tmu2 of the motoring torque. Since the voltage signal proportional to the magnitude of the armature current Ia is fed back from the shunt resistor 29 to the armature current control 31, the armature current control 31 necessarily causes the armature current Ia to flow. The field current of the second motor/generator 7 at that time is automatically controlled by the output shaft speed N2 at that time.

More specifically, where the required torque Tr exceeds the upper limit value Tmu2 of the motoring torque, then the second motor/generator 7 is operated at the upper limit value Tmu2 of its motoring torque. The microcomputer 35 provides to the output port 47 a command for operating the first motor/generator 5 in the motoring mode at a motoring torque Tm1 of "Tr−Tmu2+(Tr−T2)". Accordingly, the voltage signal MG1C for causing the first motor/generator 5 to operate at the above described motoring torque Tm1 is obtained from the output port 47. Therefore, the motor current control 27 controls the motor current from the battery 23 so that the motoring torque of the first motor/generator 5 will equal this value. Meanwhile, feedback is applied from the shunt resistor 25 to the motor current control 27, as in the case of the previously described armature current control. The reason why the difference between the required torque Tr and the output shaft torque T2 is applied is that compensation is required based on the difference from the actual output shaft torque, i.e. the torque T2 detected by the torque sensor 15, and the same applies to the following description. At the step 202 the microcomputer 35 does not provide any command to the output port 51. Accordingly, the voltage signal EC from the output port 51 is 0V and therefore the throttle control 17 tries to minimize the degree of throttle opening.

Meanwhile, if a "NO" determination results from the previous step 201, i.e. if the clutch C2 is not in a connected state, then at the following step 203 the microcomputer 35 provides a command "0 2 2 0". More specifically, no command is applied to the output port 61 and a command for operating the first motor/generator 5 at a motoring torque Tm1 of "Tr−Tmu2+(Tr−T1)" is applied to the output port 47. Meanwhile, since the said command is the same as the previously described command, except that no command is applied to the output port 61, further description of operations based on the command will be omitted. At the following step 204 the microcomputer 35 sets a timer for a predetermined time period t1 in a predetermined region, (not shown) of the random access memory 352. Time period t1 is the time required until the speed of the first motor/generator 5 increases in response to the command provided at the step 203 and it becomes possible to connect the clutch C2. Since such time period t1 is primarily determined by the characteristics of the first motor/generator 5, it is not necessary to check whether the shaft speed is high enough to allow connection of the clutch C2. After the lapse of a time period t1 set in the timer, for example 1 to 2 seconds, at the steps 205 and 206 the microcomputer 35 resets the timer and shifts to the previously described step 202.

Operation in the region ② in FIG. 2 will now be described. In such a case, the microcomputer 35 provides at the step 207 in FIG. 15B a command "0 0 1 0". More specifically, no command is applied to the output ports 61 and 47, and a command for causing the second motor/generator 7 to operate at a motoring torque Tm2 of "Tr+(Tr−T2)" is provided to the output port 49. No command is applied to the output port 51. Accordingly, in the region ②, the voltage signal MG2C from the output port 49 is applied to the armature current control 31 as a voltage signal required for operating the second motor/generator 7 at such motoring torque Tm2.

Figure 15B:
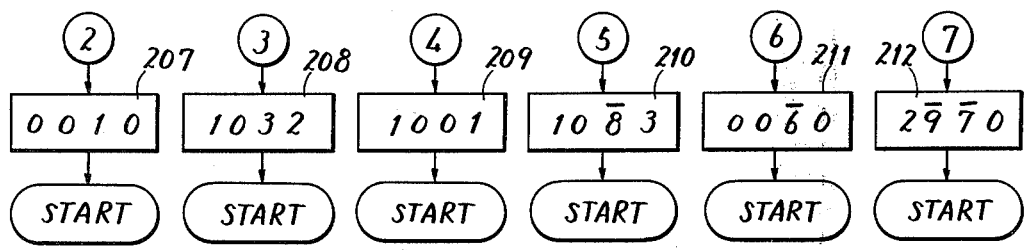

In a case of operation in the region ③ in FIG. 2, the microcomputer 35 provides at the step 208 shown in FIG. 15B a command "1 0 3 2". More specifically, in operation in the region ③, the microcomputer 35 provides to the output port 61 a command for connecting only the clutch C1 and no command is applied to the output port 47. The microcomputer 35 also provides to the output port 49 a command for causing the second motor/generator 7 to operate at a motoring torque Tm2 of "Tr−Teu+(Tr−T2)". A command for causing the engine 1 to operate at the upper limit value Teu of the engine torque is also provided to the output port 51. Accordingly, the signal c1 is applied from the output port 61 to the clutch control 21, so that only the clutch C1 included in the clutch mechanism 3 is brought to a connected state. The voltage signal MG2C for causing an armature current necessary for attaining the above described motoring torque Tm2 to flow is applied from the output port 49 to the armature current control 31. At the same time, the voltage signal EC of the maximum value such as 4 V for maximizing the degree of throttle opening is provided from the output port 51 to the throttle control 17. Accordingly, the throttle control 17 maximizes the degree of carburetor opening and accordingly the engine 1 is operated at the upper limit value Teu of its engine torque.

In a case of operation in the region ④ in FIG. 2, the microcomputer 35 provides at the step 209 shown in FIG. 15B a command "1 0 0 1". More specifically, the microcomputer 35 provides to the output port 61 a command for only connecting the clutch C1 and does not provide any command to the output ports 47 and 49. The reason is that in the region ④ the required torque Tr can be attained with the engine 1 alone. Therefore, the microcomputer 35 provides to the output port 51 a command for causing the engine 1 to operate at an engine torque Te of "Tr+(Tr−T2)". Accordingly, the voltage signal EC for attaining a degree of throttle opening necessary for attaining the above described engine torque Te is provided from the output port 51 to the throttle control 17.

In operation in the region ⑤ in FIG. 2, the microcomputer 35 provides at the step 210 shown in FIG. 15B a command "1 0 $\bar{8}$ 3". More specifically, the microcomputer 35 provides to the output port 61 a command for connecting the clutch C1 alone and does not provide any command to the output port 47 and further provides to the output port 49 a command for causing the second motor/generator 7 to operate in a generating mode at a generating torque −Tg2 of "−[(Te1−Tr)+(T2−Tr)]". Furthermore, a command for causing the engine 1 to operate at the lower limit value Te1 of its engine torque is applied to the output port 51. Accordingly, only the clutch C1 is connected in the clutch mechanism 3. At the same time, the voltage signal MG2C for attaining a generating torque −Tg2 equal to the above described torque is applied from the output port 49 to the armature current control 31. Accordingly, the armature current control 31 operates such that the second motor/generator 7 is operated in the generating mode so as to attain the above described generating torque −Tg2. The voltage signal EC of, e.g., 2 V for operating the engine 1 at the lower limit value Te1 of its engine torque is provided from the output port 51. Accordingly, the throttle control 17 controls the degree of throttle opening to approximately 50% and its engine 1 is operated at the lower limit value Te1 of its engine torque.

In operation in the region ⑥ in FIG. 2, the microcomputer 35 provides at the step 211 shown in FIG. 15B a command "0 0 $\bar{6}$ 0". More specifically, the microcomputer 35 does not provide any command to the output ports 61, 47 and 51. The reason is that in the region ⑥ a necessary braking torque −Tr can be attained by the generating torque −Tg2 of the second motor/generator 7. Therefore, the microcomputer 35 provides to the output port 49 a command for causing the second motor/generator 7 to operate in a generating mode at a generating torque −Tg2 of "−[Tr+(Tr−T2)]". Accordingly, the voltage signal MG2C (−V) for controlling a regenerated current from the second motor/generator 7 to the battery 23 for attaining the above described generating torque −Tg2 is provided. Accordingly, the second motor/generator 7 is operated in a generating mode at such generating torque −Tg2, whereby a necessary braking torque −Tr is attained.

In operation in the region ⑦ shown in FIG. 2, the microcomputer 35 provides at the step 212 shown in FIG. 15B a command "2 $\bar{9}$ $\bar{7}$ 0". More specifically, the microcomputer 35 provides to the output port 61 a command for connecting only the clutch C2. Accordingly, the signal c2 is obtained from the output port 61 and only the clutch C2 is placed in a connected state. At the same time, the microcomputer 35 provides to the output port 47 a command for causing the first motor/generator 5 to operate in a generating mode at a generating torque −Tg1 of "−[Tr−Tgu2+(Tr−T2)]". Accordingly, the voltage signal MG1C for controlling a regenerated current from the first motor/generator 5 for attaining the above described generating torque −Tg1 is provided from the output port 47 to the motor current control 27. Furthermore, the microcomputer 35 provides to the output port 49 a command for causing the second motor/generator 7 to operate in a generating mode at the generating torque −Tgu2. Therefore, the voltage signal MG2C of, e.g., −4 V for causing the second motor/generator 7 to operate at a generating torque equal to the upper limit value −Tgu2 is provided from the output port 49 to the armature current control 31. As a result, the armature current control 31 controls the regenerated current from the second motor/generator 7, to thereby attain the above described generating torque −Tgu2. Meanwhile, as in the case of an operation in the region ⑥ described previously, the engine 1 is not permitted to operate and accordingly no command is provided to the output port 51.

Figure 15C:
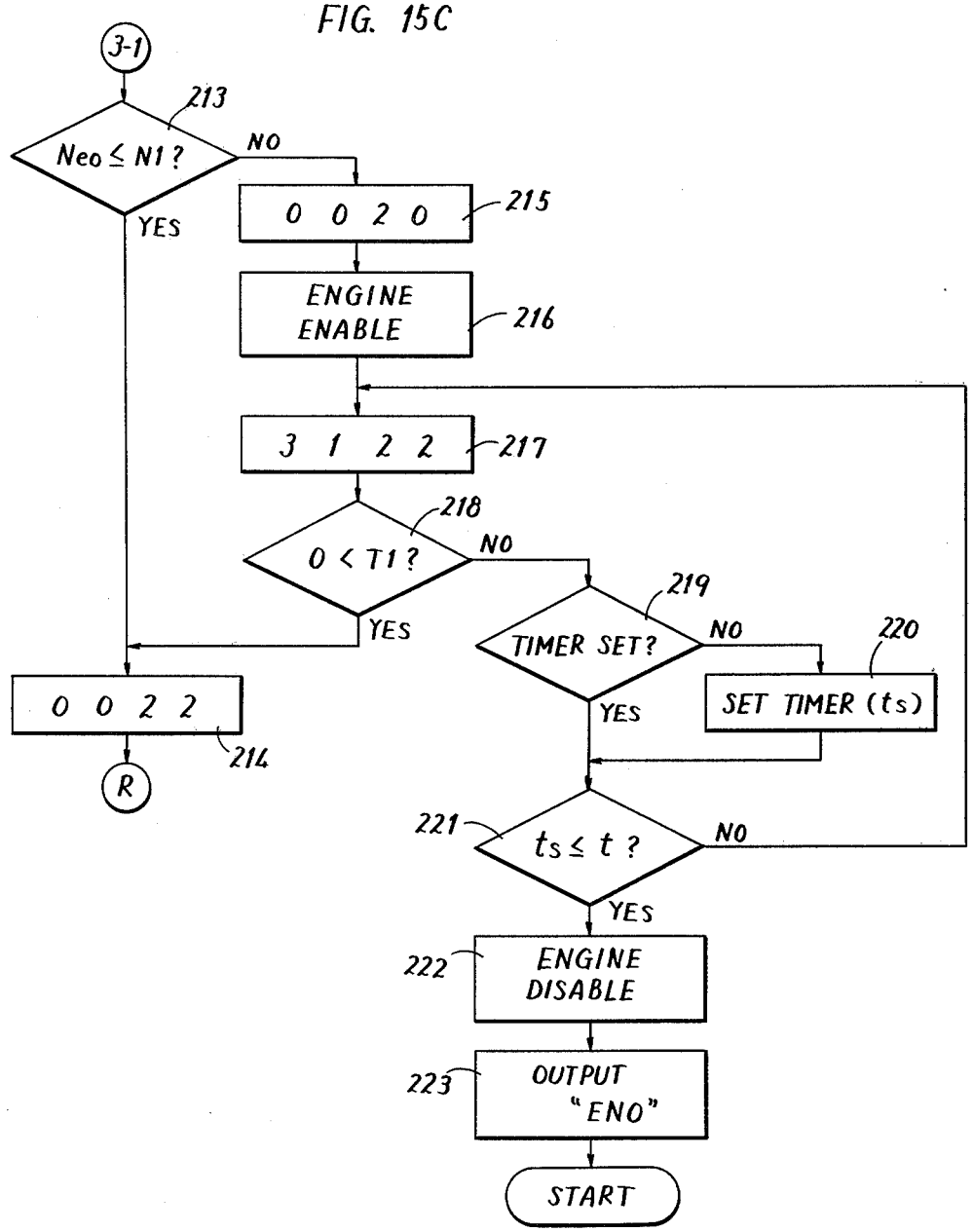

Operation in the region ③-1 in FIG. 2 will now be described with reference to FIG. 15C. Since the engine 1 is operating faster than an idle or is stopped, the microcomputer 35 determines at the first step 213 whether the engine shaft speed N1 of the engine 1 exceeds the speed Neo of the idling state. More specifically, it is determined at the step 213 whether the engine is in more than an idling state or is in a stopped state. If and when the engine is going faster than an idle, i.e. if the decision at the step 213 is "YES", then it is not necessary to start the engine 1 and the microcomputer 35 provides at the following step 214 a command "0 0 2 2". More specifically, the microcomputer 35 does not provide any command to the output ports 61 and 47 and provides to the output port 49 a command for causing the second motor/generator 7 to operate at the upper limit value Tmu2 of its motoring torque. At the same time, the microcomputer 35 provides to the output port 51 a command for causing the engine 1 to operate at the upper limit value Teu of its engine torque. Accordingly, the signal MG2C of, e.g., +4 V for causing the second motor/generator 7 to operate in a motoring mode at a motoring torque Tm2 of the upper limit value Tmu2 is provided from the output port 49 to the armature current control 31. The signal EC of, e.g., +4 V for bringing the degree of throttle opening of the engine 1 to 100% is provided from the output port 51 to the throttle control 17, to thereby increase the speed of the engine 1. The microcomputer 35 then returns to the step 114 shown in FIG. 14.

In a case of operation in the region ③-1, if the decision at the step 213 is "NO", i.e. if it is determined at the step 213 that the engine 1 is stopped, the microcomputer 35 provides at the following step 215 a command "0 0 2 0". More specifically, the microcomputer 35 does not provide any command to the output ports 61, 47 and 51 and provides to the output port 49 a command for causing the second motor/generator 7 to operate at the upper limit value Tmu2 of its motoring torque. At the following step 216 the microcomputer 35 provides to the output port 65 a signal for enabling the engine, i.e. a command for bringing the signal ES to the high level. Accordingly, the signal ES of the high level is obtained from the output port 65 and is applied to the engine enabling device 19. Therefore, the engine enabling device 19 is operated, whereby the fuel line is connected, the ignition system is enabled and so on. At the following step 217 the microcomputer 35 provides a command "3 1 2 2". More specifically, at the step 217 the microcomputer 35 provides to the output port 61 a command for connecting only the clutch C3. Accordingly, only the signal c3 of the high level is obtained from the output port 61, whereby the clutch C3 included in the clutch mechanism 3 is connected. Thus, the first motor/generator 5 is connected to the engine 1 as a starter motor. At the same time, the microcomputer provides to the output port 47 a command for causing the first motor/generator 5 to operate at a torque Tmo which is the proper value when the first motor/generator 5 is used as a starter. Accordingly, the signal MG1C of a voltage necessary for causing the first motor/generator 5 to operate at such torque Tmo is provided from the output port 47 to the motor current control 27. At that time the microcomputer 35 further continuously provides to the output port 49 a command for causing the second motor/generator 7 to operate at the upper limit value Tmu2 of its motoring torque and also provides to the output port 51 a command for causing the engine 1 to operate at the upper limit value Teu of its engine torque. More specifically, where the engine 1 is in a stopped state, the engine 1 is first enabled and the first motor/generator 5 is then operated as a starter motor, so that the engine 1 may be started. The purpose of providing at the step 217 a command for causing the engine 1 to operate at the upper limit value Teu of the engine torque is merely to open the throttle or the carburetor. After such command is provided, the microcomputer 35 determines at the following step 218 whether the engine torque of the engine 1 has become positive, i.e. whether the engine 1 is started. After decision is made at the step 218 as "YES", the microcomputer 35 returns through the previously described step 214 to the step 114 shown in FIG. 14.

If the decision at the step 218 is "NO", i.e. if the engine 1 has not yet been started, then the microcomputer 35 determines at the step 219 whether a timer has been set. If the decision at the step 219 is "NO", then at the step 220 a timer located in a predetermined region of the random-access memory 352 is set to a predetermined time period ts, whereupon the program shifts to the step 221. The predetermined time period ts may be selected arbitrarily and may be selected to about 10 to 30 seconds. At the step 221 it is determined whether the set time period ts has lapsed. If it is determined that the set time period ts has not lapsed, a starting operation by the first motor/generator 5 is continued during that set time period ts. After the lapse of the set time period, i.e. if the decision at the step 221 is "YES", the microcomputer 35 provides to the output port 65 a command for bringing the signal ES to the low level for causing the enabling means 19 to disable the engine. More specifically, if the engine 1 is not started even after the lapse of the set time period ts, then the microcomputer 35 treats the engine 1 as being disabled and at the following step 223 a command for bringing the signal ENO to the high level is provided to the output port 63. Accordingly, where the engine 1 cannot be started, the engine flag is set and accordingly the engine incapability lamp 71e (FIG. 6A) is lighted to so notify a driver.

Now referring to FIG. 15D, operation in the region ③-2 in FIG. 2 will be described. In the region ③-2, the commands from the microcomputer 35 at the steps 225, 226 and 228 are different from the commands at the steps 214, 215 and 217 shown in FIG. 15C, while the remaining steps are the same as those shown in FIG. 15C, and therefore a duplicate description will be omitted. In the region ③-2, since the engine 1 is either going faster than an idle or is stopped in spite of the fact that the output shaft speed N2 of the vehicle is within the speed range in which operation of the engine 1 is permitted, the engine 1 is utilized as a prime mover. The required torque Tr in such a case is smaller than the upper limit value Tmu2 of the motoring torque of the second motor/generator 7. Accordingly, at the step 225 the microcomputer 35 provides a command "0 0 1 1", so that the second motor/generator 7 is operated at a motoring torque Tm2 of "Tr+(Tr−T2)" and at the same time the throttle or the carburetor is set so that the engine 1 is operated at an engine torque Te of "Tr+(Tr−T2)". After the step 225, the program returns to the previously described step 114 shown in FIG. 14. At the step 226 the microcomputer 35 provides a command "0 0 1 0" and the second motor/generator 7 is operated at a motoring torque Tm2 of "Tr+(Tr−T2)". At the step 228 the microcomputer 35 provides a command "3 1 1 1" and the clutch C3 is connected, while the first motor/generator 5 is operated as a motor starter and second motor/generator 7 is operated at a motoring torque Tm2 of "Tr+(Tr−T2)" and the throttle or the carburetor is set so that the engine 1 is operated at an engine torque Te of "Tr+(Tr−T2)".

In the foregoing several cases, the engine mode, the motoring mode and the generating mode were all capable of operation in the automatic control mode. In other words, the control operations in the respective regions ① to ⑦ shown in FIG. 2 were discussed. Several cases in which at least one mode is incapable of operation will now be described.

Figure 16:
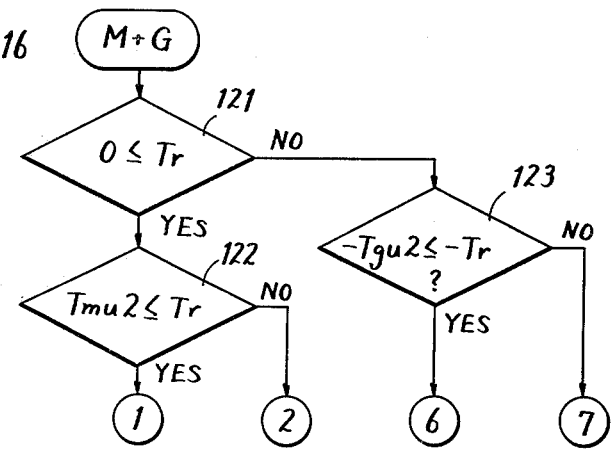

First referring to FIG. 16, a case in which the engine mode is prohibited will be described. In such a case, the microcomputer 35 determines at the first step 121 whether the required torque Tr is positive. If the decision at the step 121 is "YES", the microcomputer 35 further determines at the following step 122 whether the required torque Tr exceeds the upper limit value Tmu2 of the motoring torque of the second motor/generator 7. If it is determined that the required torque Tr exceeds the upper limit value Tmu2, then the previously described operation in the region ① is performed, and otherwise the previously described operation in the region ② is performed. If the decision at the step 121 is "NO", i.e. if the required torque Tr is negative, the microcomputer 35 further determines at the step 123 whether a required braking torque −Tr at that time is smaller than the upper limit value −Tgu2 of the generating torque of the second motor/generator 7. If the decision at the step 123 is "YES", this means that the braking torque can be attained using the second motor/generator 7 alone and the previously described operation in the region ⑥ is performed. Conversely, if and when the decision at the step 123 is "NO", then previously described operation in the region ⑦ is performed.

Figure 17:
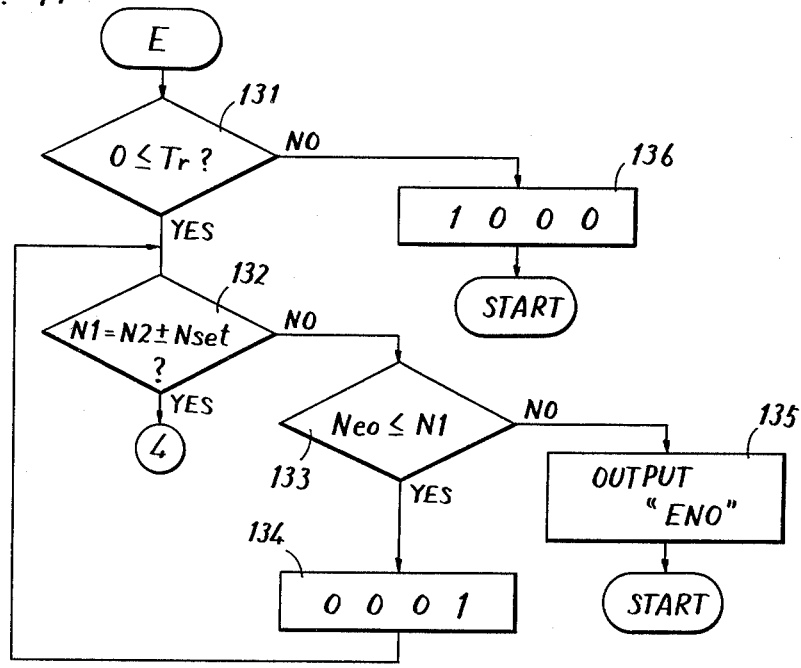

Now referring to FIG. 17, a case where only the engine mode is permitted will be described. The microcomputer 35 determines at the first step 131 whether the required torque Tr is positive. If it is determined that the required torque Tr is positive, the microcomputer 35 determines at the following step 132 whether the engine shaft speed N1 of the engine 1 is equal to the output shaft speed N2 of the vehicle. "Nset" at the step 132 is the speed determined in consideration of an error occurring due to a level difference in the signal. Accordingly, at the step 132 it is determined whether the speed N1 is substantially the same as the speed N2. If the decision at the step 132 is "YES", then only the engine 1 is used as a prime mover in the previously described region 4 by connecting the clutch C1.

If the decision at the step 132 is "NO", i.e. if the engine shaft speed N1 of the engine 1 is not substantially the same as the speed N2, the microcomputer 35 determines at the following step 133 whether the speed N1 exceeds Neo, the idling speed of the engine 1. More specifically, it is determined whether the engine 1 is in an idling state or a stopped state. If and when the decision at the step 133 is "YES", the microcomputer 35 provides at the following step 134 a command "0 0 0 1", whereby the throttle or the carburetor is set so that the engine 1 is operated at an engine torque Te of "Tr+(Tr−T2)", whereupon the program returns to the step 132. Conversely, if the decision at the step 133 is "NO", i.e. if it is determined that the engine 1 is in a stopped state, the microcomputer 35 provides at the following step 135 a command to the output port 63, whereby the signal ENO is obtained as the high level. As a result, the engine incapability lamp 71e shown in FIG. 6A is lighted.

If the decision at the previous step 131 is "NO", i.e. if the required torque Tr is negative, the microcomputer 35 provides at the following step 136 a command "1 0 0 0", whereby only the clutch C1 is placed in a connected state and the engine 1 operated at idle, awaiting braking. The reason is that, although a negative required torque Tr means that the braking torque −Tr is required, the generating mode for attaining the braking torque is incapable in such a case.

Figure 18:
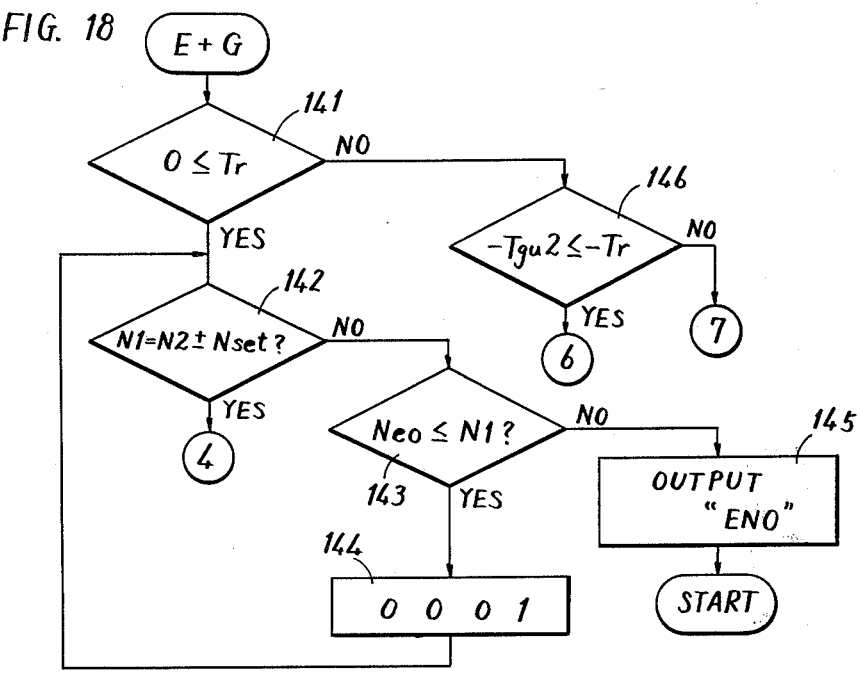

Now referring to FIG. 18, a case where the engine mode and the operating mode are not prohibited will be described. As compared with a control shown in FIG. 17, the control is substantially the same as that shown in FIG. 17, except that control after the decision at the first step as "NO" is different, and therefore a duplicate description will be omitted. More specifically, if the decision at the first step 141 is "NO", i.e. if it is determined that the required torque Tr is negative, then it is determined at the following step 146 whether the required braking torque −Tr exceeds the upper limit value −Tgu2 of the generating torque of the second motor/generator 7. More specifically, in the case of FIG. 18, since the generating mode is not prohibited as compared with the case shown in FIG. 17, the braking torque can be attained by a combination of the first and second motor/generators 5 and 7. Accordingly, if the decision at the step 146 is "YES", the previously described operation in the region ⑥ is performed. If and when the decision at the step 146 is "NO", then the previously described operation in the region ⑦ is performed.

Figure 19:
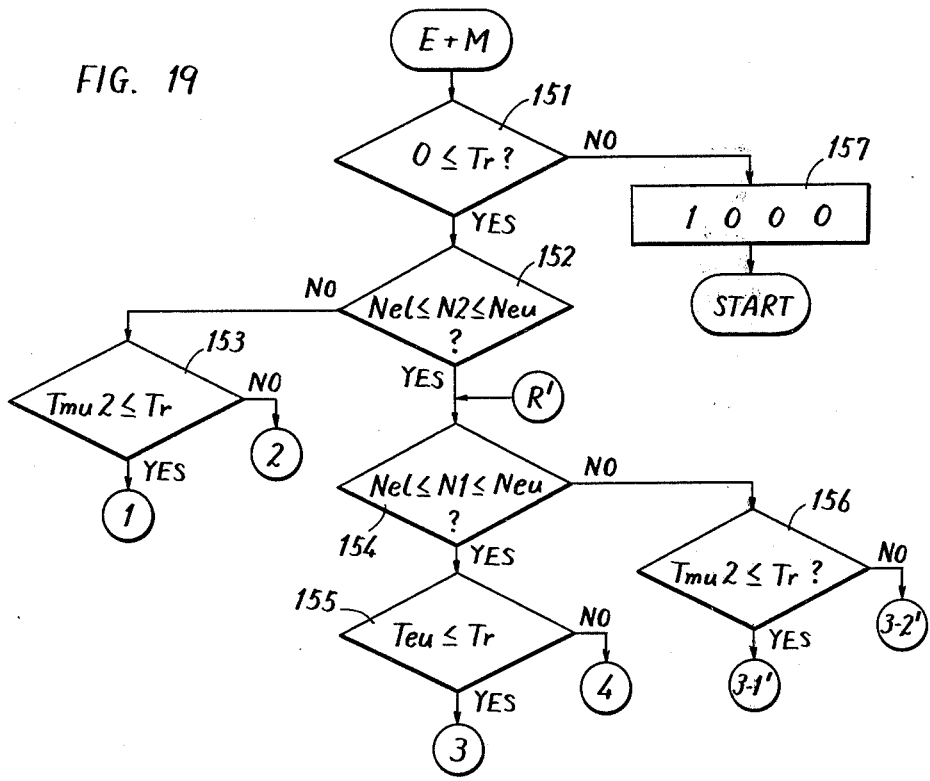

Now referring to FIG. 19, a control in a case where only the engine mode and the motoring mode are allowed will be described. In such a case, the microcomputer 35 determined at the first step 151 whether the required torque Tr is positive. If the required torque is negative, the microcomputer provides at the step 157 the same command as that at the previous step 136 shown in FIG. 17. If the decision at the step 151 is "YES", the microcomputer 35 determines at the following step 152 whether the output shaft speed N2 of the vehicle is within the speed range in which the engine 1 is permitted to operate. The reason is that since the engine mode has been allowed, the engine 1 should be operated. If the decision at the step 152 is "NO", since the engine 1 is not permitted to operate, the same control as that at the previous step 113 (FIG. 14) is made. The following step 154 after the "YES" decision at the step 152 is the same as that at the step 114. The further steps 155 and 156 are the same as the previously described steps 115 and 117, respectively. However, if the decision at the step 155 is "NO", since the generating mode is not allowed, an operation is made in the region ④ described previously. If the decision at the step 156 is "YES", an operation is made in the region ③-1 described previously, and if the decision at the step 156 is "NO", an operation is made in the region ③-2 described previously, whereupon in either case of an operation in the region ③-1 and an operation in the region ③-2 thereafter the program returns to the step 154.

Thus, the automatic control mode in the case where the switch 71 shown in FIG. 6A is operated is executed.

Now a case where the switch 73 shown in FIG. 6A is operated, i.e. a case where the manual operation is selected will be described. In such a case, it is necessary to select an engine mode or a motoring mode by means of a switch 73e or 73m. Consider a case where the switch 73e is operated to select the engine mode. In such a case, the signal EC(M) is provided from the switching circuit 77 shown in FIG. 6B to the engine enabling means 19. Thus the engine 1 is enabled. At that time the output voltage AP obtained from the accelerating circuit 67 (FIG. 5) is provided from the switching circuit 77 as the signal AP(E) to the throttle control 17. Accordingly, the throttle control 17 controls the throttle or the carburetor in direct association with the depression amount or the opening degree of the accelerating pedal 67a.

Now consider a case where the switch 73m is operated to select the motoring mode. In such a case the signal AP obtained from the accelerating circuit 67 is provided through the switching circuit 77 as the signal AP(M) to the armature current control 31 and the signal BF from the braking circuit 69 is also provided as the signal BF(M) to the armature current control 31. Accordingly, the armature current control 31 is responsive to the given signal, i.e. responsive to the depression amount of the accelerating pedal and/or the depressing force of the braking pedal 69b to directly control the current of the second motor/generator 7.

Meanwhile, the reset or check switch 75 shown in FIG. 6A is used to check whether the lamps 71e, 71m and 71g and the lamps of the lamp combined switches 71, 73, 73e and 73m are out of order. More specifically, if the switch 75 is operated, all the lamps 71e, 71m and 71g and the lamps of the lamp combined switches 71, 73, 73e and 73m are lighted and all the flags are reset. Accordingly, the respective driving circuits 79e, 79m and 79g may comprise flip-flops which are set responsive to the respective input signals and are once reset responsive to the operation of the switch 75.

Figure 21:
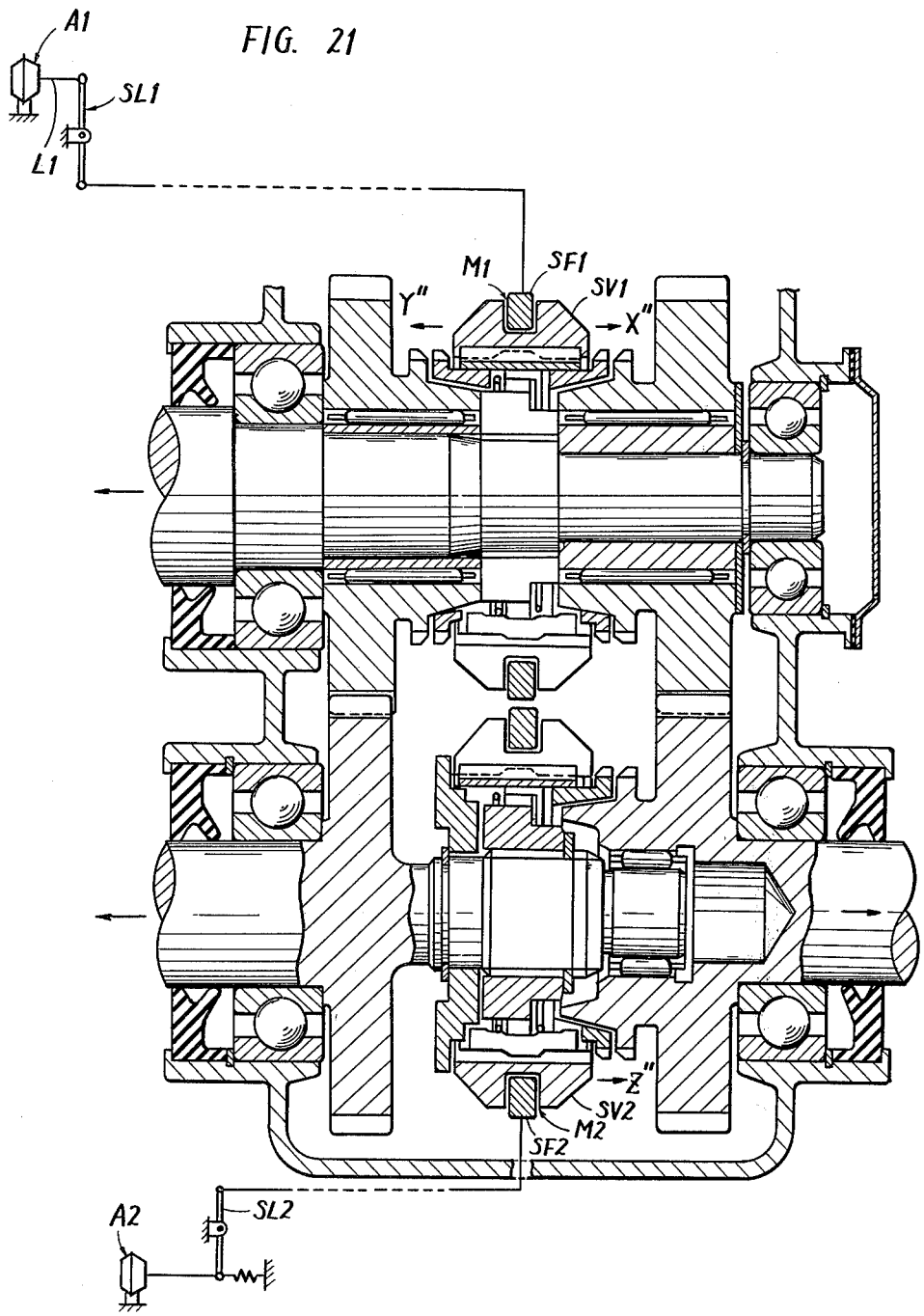
FIG. 21 is a sectional view showing in detail a synchro type clutch.
Figure 22:
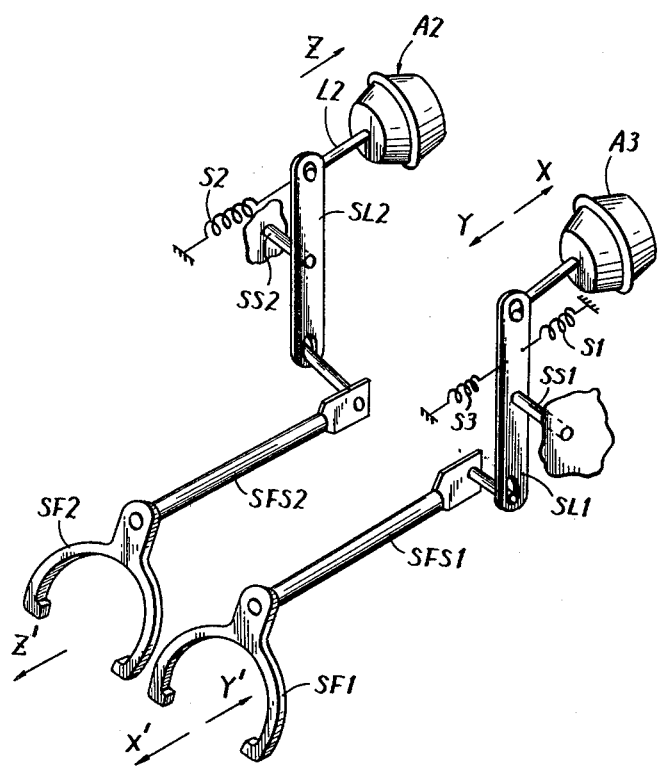
FIG. 22 is a perspective view for explaining shift forks.

Although in the foregoing the transmission or the clutch mechanism 3 was described as comprising an electromagnetic clutch, alternatively the transmission may comprise a synchro type clutch. Now referring to FIGS. 20 to 22, a case where a synchro type clutch is used will be described. Shift forks SF1 and SF2 are engageable with grooves M1 and M2 formed at the outer peripheral surfaces of sleeves SV1 and SV2 (FIG. 21) of the respective clutch main bodies, respectively. The shift fork SF1 is coupled through a shift fork shaft SFS1, a shift lever SL1 and a rod L1 to an actuator A1. The shift lever SL1 is rotatably supported by a supporting shaft SS1. The shift fork SF2 is coupled through a shift fork shaft SFS2, a shift lever SL2 and a rod L2 to an actuator A2. The shift lever SL2 is rotatably supported by a supporting shaft SS2. Accordingly, if the rod L1 is moved in the direction of arrow X in FIG. 22, then the shift fork SF1 is moved in the direction of arrow X' and the sleeve SV1 is moved in the direction of arrow X'' in FIG. 21. As a result, a connection of the clutch C1 is established. Likewise, if the rod L1 is moved in the direction of arrow Y in FIG. 22, the sleeve SV1 is moved in the direction of arrow Y'' in FIG. 21 and a connection of the clutch C3 is established. Furthermore, if the rod L2 is moved in the direction of arrow Z in FIG. 22, the sleeve SV2 is moved in the direction of arrow Z'' in FIG. 21 and the clutch C2 is connected.

Figure 20:
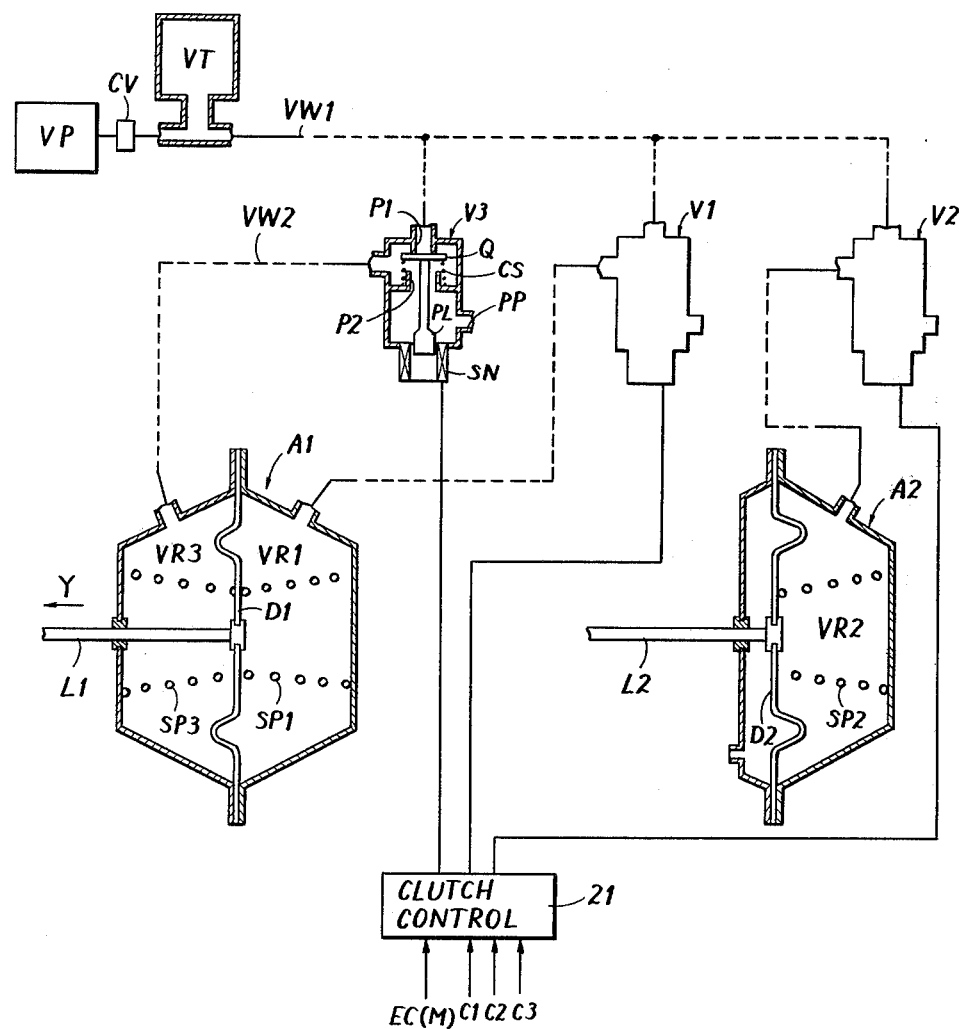
FIG. 20 is a schematic diagram of an actuator and a control system where a synchro type clutch is used as a transmission or clutch mechanism.

FIG. 20 shows in more detail a control of the actuators A1 and A2 and other actuators. Referring to FIG. 20, the actuator A1 comprises two negative pressure chambers VR1 and VR3 partitioned by a diaphragm D1. Springs SP1 and SP3 are provided to maintain the diaphragm D1 at a neutral position as shown in FIG. 20 if the pressure in the respective negative pressure chambers VR1 and VR3 is the same. The actuator A2 is different from the actuator A1 in that a single negative pressure chamber VR2 is provided. A spring SP2 of the actuator A2 is provided to maintain the diaphragm D2 at the position shown in FIG. 20 when the pressure of the negative pressure chamber VR2 is atmospheric pressure. The respective negative pressure chambers VR1, VR2, and VR3 are coupled to electromagnetic solenoid valves V1, V2 and V3, respectively, and the diaphragms D1 and D2 are coupled to the rods L1 and L2, respectively. The electromagnetic solenoids V1, V2 and V3 are provided so as to correspond to the respective negative pressure chambers, so that if a clutch connection command signal c1 or EC(M) is applied the valve V1 is operated, whereas if the signals c2 and c3 are applied the valves V2 and V3 are operated, respectively. The electromagnetic solenoid valves V1, V2 and V3 all have the same structure and only the structure of the electromagnetic solenoid valve V3 is depicted in detail. The electromagnetic solenoid valve V3 comprises a valve member Q, such that the valve member Q rests on a valve base P1 by means of a spring CS as shown in FIG. 20 if the electromagnetic solenoid SN is not energized. In such a state, the negative pressure chamber VR3 of the actuator A1 is opened to the atmosphere through a pipe VW2 and an atmosphere communicating port TP of the electromagnetic solenoid valve V3. Assuming that the solenoid of the electromagnetic solenoid valve V1 has not been energized, the negative pressure chamber VR1 is also opened to the atmosphere and therefore the diaphragm D1 is maintained in a neutral position. The case where the command signal c3 for connecting the clutch c3 is provided will be described. In such a case, the clutch controller 21 is responsive to the command signal c3 to energize the solenoid SN of the electromagnetic solenoid valve V3. Accordingly, the solenoid SN attracts an iron plunger piece PL and the valve member Q connected to the iron plunger piece PL is moved away from the valve base P1 to rest on the valve base P2 provided at the opposite side. In such a state, the negative pressure chamber VR3 is coupled through the pipe VW2 and the electromagnetic solenoid valve V3 to the pipe VW1. The pipe VW1 is coupled through the vacuum tank VT and a check valve CV to a vacuum pump VP. The vacuum tank VT serves to absorb pressure fluctuations when the vacuum tank VT is operated and to preserve the negative pressure. Accordingly, the pipe VW1 always has a negative pressure state and the negative pressure chamber VR connected thereto also has a negative pressure state. On the other hand, since the negative pressure chamber VR1 is opened for the atmosphere, the diaphragm D1 and the rod L1 coupled thereto are moved in the direction of arrow Y. Meanwhile, the direction of arrow Y in FIG. 20 has been illustrated to be consistent with that shown in FIG. 22 and therefore the clutch C3 is connected due to the movement in the direction of arrow Y, as described previously.

Since a case where the command signal c1 and c2 for connecting other clutches C1 and C2 is provided is also the same, a description therefor will be omitted. Where no command signal is provided, due to the functions of the return springs S1, S2, and S3 and the springs SP1, SP2 and SP3 provided in the actuators, the clutches are maintained in a disconnected state. As in the previously described embodiment, when only the clutch C1 is placed in a connected state, a relation of the speeds is "N1=N2=the output shaft speed of the vehicle" and accordingly a relation of the torque is "T2=T1+Tm2". If and when only the clutch C2 is in a connected state, a relation of the torque is "T2=Tm1+Tm2" and N1 and T1 are not equal to N2 and T2, respectively. The clutch C3 is placed in a connected state, only if the engine 1 is started by means of the first motor/generator 5.

Although the present invention has been described and illustrated in detail, it is clearly understood that the same is by way of illustration and example only and is not to be taken by way of limitation, the spirit and scope of the present invention being limited only by the terms of the appended claims.

TABLE (Commands List)

Commands "n1 n2 n3 n4"

n1; Command for the output port 61 (Clutch Control)
n2; Command for the output port 47 (Motor Current Control)
n3; Command for the output port 49 (Armature Current Control)
n4; Command for the output port 51 (Throttle Control)

n1
1  Engaging the C1 only
2  Engaging the C2 only
3  Engaging the C3 only
0  No command (Disengaging the clutches)

n2
1  Motoring with the torque of "Tmo"
2  Motoring with the torque of "Tr-Tmu2 + (Tr-T2)"
9  Generating with torque of "-[Tr-Tgu2 + (Tr-T2)]
0  No command (Freewheeling the First Motor/Generator)

n3
1  Motoring with torque of "Tr + (Tr-T2)
2  Motoring with torque of "Tmu2"
3  Motoring with torque of "Tr-Teu + (Tr-T2)"
6  Generating with torque of "-[Tr + (Tr-T2)]"
7  Generating with torque of "-Tgu2"
8  Generating with torque of "-[(Tel-Tr) + (T2-Tr)]"
0  No command (Freewheeling the Second Motor/Generator)

n4
1  Operating with torque of "Tr + (Tr-T2)"
2  Operating with torque of "Teu"
3  Operating with torque of "Tel"
0  No command (Idling)

What is claimed is:

1. An apparatus for controlling a hybrid vehicle having an output shaft and wheels coupled thereto, comprising:

an internal combustion engine having an engine shaft and a throttle;
throttle control means for controlling opening of said throttle as a function of a first variable,
a first electric motor,
a second electric motor having a motor shaft coupled to said output shaft of said vehicle,
a battery for supplying electric power to said first and second motors,
first motor control means for controlling power flow from said battery to said first motor as a function of a second variable,
second motor control means for controlling power flow from said battery to said second motor as a function of a third variable,
coupling means for selectively disconnecting and connecting (a) said engine and said second motor and (b) said first and second motors,
speed adjustment operating means for adjusting the speed of said hybrid vehicle,
first data providing means for providing data relating said first variable to the speed and torque of said engine,
second data providing means for providing data relating said second variable to the speed and torque of said first motor,
third data providing means for providing data relating said third variable to the speed and torque of said second motor,
first speed sensing means cooperating with said motor shaft for providing motor shaft speed data concerning the speed thereof,
required torque data providing means for providing data concerning required torque based on the status of said speed adjustment operating means and said motor shaft speed data,
first determining means for determining whether said required torque is positive,
second determining means for determining whether said motor shaft speed data is within a predetermined optimum speed range of said engine when said first determining means determines that said required torque is positive,
third determining means for determining whether said required torque exceeds a predetermined first upper limit value of a predetermined torque range of said engine when said second determining means determines that said motor shaft speed data obtained from said first speed sensing means is within said optimum speed range,
first coupling means control means for causing said coupling means to connect said engine and said second motor in response to a determination by said third determining means that said required torque exceeds said first upper limit value, and
first control means for providing said first variable to said throttle control means by referring to said first data providing means and maximizing opening of said throttle and for providing said third variable to said second motor control means by referring to said third data providing means and operating said second motor with a torque associated with a difference between said required torque and said first upper limit value, in response to a determination by said third determining means that said required torque exceeds said first upper limit value.

2. Apparatus in accordance with claim 1, which further comprises fourth determining means for determining whether said required torque exceeds a predetermined second upper limit value of a predetermined torque range of said second motor when said second determining means determines that said speed data obtained from said first speed sensing means is outside said optimum speed range,
second coupling means control means for causing said coupling means to connect said first and second motors in response to a determination by said fourth determining means that said required torque exceeds said second upper limit value, and
second control means for providing said third variable to said second motor control means and operating said second motor at said second upper limit value by referring to said third data providing means and for providing said second variable to said first motor control means for operating said first motor with a torque associated with a difference between said required torque and said second upper limit value by referring to said second data providing means, in response to a determination by said fourth determining means that said required torque exceeds said second upper limit value.

3. Apparatus in accordance with claim 2, which further comprises fifth control means for providing said third variable to said second motor control means and thereby bringing the torque of said second motor to said required torque by referring to said third data providing means in response to a determination by said fourth determining means that said required torque is less than said second upper limit value.

4. Apparatus in accordance with claim 1, which further comprises fifth determining means for determining whether said required torque is within said torque range of said engine when said second determining means determines that said motor shaft speed data is within said optimum speed range, said first coupling means control means being operated in response to a determination by said fifth determining means that said required torque is within said torque range of said engine, and third control means for providing said first variable to said throttle control means and operating said engine at said required torque by referring to said first data providing means in response to a determination by said fifth determining means that said required torque is within said torque range of said engine.

5. Apparatus in accordance with claim 1, wherein said second electric motor is operable as a second generator, and which further comprises second generator control means for controlling regenerated power flow from said second motor to said battery as a function of a fourth variable, fourth data providing means for providing data relating said fourth variable to the speed and torque of said second motor, said first coupling means control means being operated when said fifth determining means determines that said required torque is within said torque range of said engine and when said first determining means determines that said required torque is positive, and fourth control means for providing said first variable to said throttle control means and operating said engine at a predetermined lower limit value of said predetermined torque range of said engine by referring to said first data providing means and for providing said fourth variable to said second generator control means and bringing the generating torque of said second motor to a torque associated with a difference between said lower limit value and said required torque by referring to said fourth data providing means, in response to a determination by the fifth determining means that said required torque is outside said torque range of said engine and to another determination by said first determining means that said required torque is positive.

6. Apparatus in accordance with claim 1, which further comprises second speed sensing means cooperating with said engine shaft for providing engine shaft speed data concerning the speed thereof, sixth determining means for determining whether said engine shaft speed data is within said optimum speed range when said second determining means determines that said speed data obtained from said second speed sensing means is within said optimum speed range, seventh determining means for determining whether said required torque exceeds a second predetermined upper limit value of a predetermined torque range of said second motor when said sixth determining means determines that said engine shaft speed data obtained from said second speed sensing means is within said optimum speed range, and sixth control means for providing said third variable to said second motor control means by referring to said third data providing means and operating said second motor at said second upper limit value in response to a determination by said seventh determining means that said required torque exceeds said second upper limit value.

7. Apparatus in accordance with claim 6, which further comprises seventh control means for providing said third variable to said second motor control means by referring to said third data providing means and operating said second motor at said required torque in response to a determination by said seventh determining means that said required torque is less than said second upper limit value.

8. Apparatus in accordance with claim 1, wherein said first and second motors are operable as first and second generators respectively, said second and third data providing means respectively provide data relating said second variable to the speed and torque of said first motor when operated as a generator and data relating said third variable to the speed and torque of said second motor, said first and second motor control means control flow of regenerated power from said first and second motors when operated as generators to said battery as functions of said second and third variables respectively, and wherein said apparatus further comprises eighth determining means for determining whether a negative required torque exceeds a third predetermined upper limit value of a predetermined range of generating torque of said second motor operated as a second generator when said first determining means determines that said required torque is negative, and eighth control means for providing said third variable to said second motor control means by referring to said third data providing means and operating said second motor as a generator at said third upper limit value and for providing said second variable to said first motor control means by referring to said second data providing means and operating first motor as a generator with a torque associated with a difference between said negative required torque and said third upper limit value in response to a determination by said eighth determining means that said negative required torque exceeds said third upper limit value.

9. Apparatus in accordance with claim 8, which further comprises ninth control means for providing said third variable to said generator control means by referring to said third data providing means and operating said second motor as a generator at said negative required torque in response to a determination by said eighth determining means that said negative required torque is less than said third upper limit value.

10. Apparatus in accordance with claim 1, which further comprises motoring mode incapability flag means for providing a flag representing that the hybrid vehicle is incapable of operating in a motoring mode, motoring flag control means for setting said motoring incapability flag means when at least one of said first and second electric motors does not satisfy a first predetermined condition in which said first and second motors are permitted to operate, engine incapability flag means for providing a flag representing that said engine is not permitted to operate, and engine flag setting means for setting said engine incapability flag means when said engine does not satisfy a second predetermined condition in which said engine is permitted to operate.

11. Apparatus in accordance with claim 10, wherein said first predetermined condition is determined in conjunction with said second motor.

12. Apparatus in accordance with claim 10, wherein said first predetermined condition is determined in conjunction with said battery.

13. Apparatus in accordance with claim 12, which further comprises tenth determining means for determining whether said engine incapability flag means has been set, and engine/motor enabling means for permitting said engine and said first and second motors to operate in response to a determination by said ninth determining means that said motoring mode incapability flag has not been set and a determination by said tenth determining means that said engine incapability flag means has not been set.

14. Apparatus in accordance with claim 13, wherein said engine/motor enabling means responds to a determination by said tenth determining means that said engine incapability flag means has been set by permitting said first and second motors to run.

15. Apparatus in accordance with claim 10, which further comprises ninth determining means for determining whether said motoring incapability flag means has been set, and motor disabling means for preventing said first and second motors from operating in response to a determination by said ninth determining means that said motoring incapability flag means has been set.

16. An apparatus for controlling a hybrid vehicle having an output shaft and wheels coupled thereto, comprising:

an internal combustion engine having an engine shaft and a throttle, throttle control means for controlling opening of said throttle as function of a first variable, a first generator, a second generator having a generator shaft coupled to said output shaft of said vehicle, a battery regenerated by electric power generated by at least one of said first and second generators, first generator control means for controlling power flow from said first generator to said battery as a function of a second variable, second generator control means for controlling power flow from said second generator to said battery as a function of a third variable, coupling means for selectively disconnecting and connecting (a) said engine and said second generator and (b) said first and second generators, speed adjustment operating means for adjusting the speed of said hybrid vehicle, brake operating means for braking said hybrid vehicle, first data providing means for providing data relating said first variable to the speed and torque of said engine, second data providing means for providing data relating said second variable to the speed and torque of said first generator, third data providing means for providing data relating said third variable to the speed and torque of said second generator, speed sensing means cooperating with said generator shaft for providing generator shaft data concerning the speed thereof, required torque data providing means cooperating with at least said speed adjustment operating means and said brake operating means for providing data concerning required torque based on the status of at least said speed adjustment operating means and said brake operating means and the generator shaft data obtained from said speed sensing means, first determining means responsive to said required torque data obtained from said required torque data providing means for determining whether said required torque is negative, second determining means for determining whether said required torque exceeds a first predetermined upper limit value of a predetermined generating torque range of said second generator when said first determining means determines that said required torque is negative, coupling means control means for causing said coupling means to connect said first and second generators in response to a determination by said second determining means that said negative required torque exceeds said predetermined first upper limit value, and first control means for providing said third variable to said second generator control means by referring to said third data providing means and operating said second generator at said second generator at said first upper limit value and for providing said second variable to said first generator control means by referring to said second data providing means and operating said first generator at a generating torque associated with a difference between said negative required torque and said first upper limit value in response to a determination by said second determining means that said negative required torque exceeds said first upper limit value.

17. Apparatus in accordance with claim 16, which further comprises second control means for providing said third variable to said second generator control means and operating said second generator at said required torque by referring to said third data providing means in response to a determination by said second determining means that said negative required torque is less than said first upper limit value.

18. Apparatus in accordance with claim 16, which further comprises
generator incapability flag means for providing a flag representing that the first and second generators are incapable of operating in a generating mode, and
generator flag control means for setting said generator incapability flag means when at least one of said first and second generators does not satisfy a predetermined condition in which said first and second motors can be operated in a generating mode.

19. Apparatus in accordance with claim 18, wherein said predetermined condition is determined in conjunction with said second motor.

20. Apparatus in accordance with claim 18, wherein said predetermined condition in which said first and second motors can be operated as generators is determined in conjunction with said battery.

21. Apparatus in accordance with claim 18, which further comprises generator enabling means for causing said first and second motors to be operable as generators when said generator incapability flag means has not been set.

22. Apparatus in accordance with claim 21, which further comprises
engine incapability flag means for providing a flag representing that said engine is not permitted to operate,
engine flag control means for setting said engine incapability flag means when said engine does not satisfy a predetermined condition in which said engine can be permitted to operate, and
engine/generator enabling means for permitting said engine to operate and permitting said second generator to operate when said engine incapability flag means has not been set.

23. Apparatus in accordance with claim 22, which further comprises
motor incapability flag means for providing a flag representing that the hybrid vehicle cannot be operated in a motoring mode,
motor flag control means for setting said motor incapability flag means when at least one of said first and second motors does not satisfy a predetermined condition in which said first and second motors can be permitted to operate, and
motor enabling means for permitting said first and second motors to operate when said motor incapability flag means has not been set.

24. An apparatus for controlling a hybrid vehicle having an output shaft and wheels coupled thereto, comprising:
an internal combustion engine having an engine shaft and a throttle,
throttle control means for controlling opening of said throttle as a function of a given first variable,
a first electric motor,
a second electric motor having a motor shaft coupled to said output shaft of said vehicle,
a battery for supplying electric power to said first and second motors,
first motor control means for controlling power flow from said battery to said first motor,
second motor control means for controlling power flow from said battery to said second motor,
speed adjustment operating means for adjusting the speed of said hybrid vehicle,
mode selecting means for selecting an operation mode of said hybrid vehicle from a group of operation modes which includes a motoring mode and an internal combustion engine mode,
first enabling means for interconnecting said speed adjustment operating means with at least said second motor control means to operate said second motor, in response to a selection of a motoring mode by said mode selecting means, and
second enabling means for connecting said speed adjustment operating means to said throttle control means to operate said throttle, in response to a selection of said internal combustion engine mode by said mode selecting means.

25. Apparatus in accordance with claim 24, wherein said second motor has a relatively large output, and said first motor has a relatively small output.

26. Apparatus in accordance with claim 25, wherein said second electric motor is selected to provide an average output required by said vehicle, and said first electric motor is selected to provide an output equal to a difference between a maximum output required by said vehicle and said average output.

* * * * *